US009456384B2

United States Patent
Cui et al.

(10) Patent No.: US 9,456,384 B2
(45) Date of Patent: Sep. 27, 2016

(54) MESSAGE PROCESSING METHOD, DEVICE, AND SYSTEM

(71) Applicant: HUAWEI TECHNOLOGIES CO., LTD., Shenzhen (CN)

(72) Inventors: Xiangsong Cui, Beijing (CN); Fang Yu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 49 days.

(21) Appl. No.: 14/061,998

(22) Filed: Oct. 24, 2013

(65) Prior Publication Data

US 2014/0050096 A1    Feb. 20, 2014

Related U.S. Application Data

(63) Continuation of application No. PCT/CN2012/074770, filed on Apr. 26, 2012.

(30) Foreign Application Priority Data

Apr. 26, 2011    (CN) .......................... 2011 1 0105530

(51) Int. Cl.
*H04W 28/12* (2009.01)
*H04L 1/16* (2006.01)
*H04L 1/18* (2006.01)

(52) U.S. Cl.
CPC ............ *H04W 28/12* (2013.01); *H04L 1/1685* (2013.01); *H04L 1/1867* (2013.01); *H04L 1/1635* (2013.01); *H04L 1/1874* (2013.01)

(58) Field of Classification Search
CPC ....... H04L 69/00; H04L 69/16; H04L 80/00; H04L 80/06
See application file for complete search history.

(56) References Cited

U.S. PATENT DOCUMENTS

| 5,477,550 A | 12/1995 | Crisler et al. |
| 2002/0196760 A1* | 12/2002 | Malomsoky et al. ........ 370/338 |

(Continued)

FOREIGN PATENT DOCUMENTS

| CA | 02676002 A | 7/2008 |
| CN | 1528077 | 9/2004 |

(Continued)

OTHER PUBLICATIONS

Extended and Supplementary European Search Report issued on Sep. 30, 2014 in corresponding European Patent Application No. 12777428.9.

(Continued)

*Primary Examiner* — Anh-Vu Ly
*Assistant Examiner* — Hector Reyes Ortiz
(74) *Attorney, Agent, or Firm* — Staas & Halsey LLP

(57) ABSTRACT

The present invention provides a message processing method, device, and system. The method includes: receiving a TCP data acknowledgement message sent by a UE; obtaining, according to the TCP data acknowledgement message, an identifier of a TCP data packet successfully received by the UE; obtaining, according to correspondence between the identifier of the TCP data packet and an identifier of at least one RLC protocol AMD PDU, the identifier of the at least one RLC protocol AMD PDU corresponding to the identifier of the TCP data packet; and determining that the UE has successfully received the at least one RLC protocol AMD PDU corresponding to the identifier of the at least one RLC protocol AMD PDU.

19 Claims, 14 Drawing Sheets

(56) References Cited

U.S. PATENT DOCUMENTS

| | | | |
|---|---|---|---|
| 2003/0123485 A1* | 7/2003 | Yi et al. | 370/477 |
| 2004/0052234 A1* | 3/2004 | Ameigeiras et al. | 370/338 |
| 2004/0233882 A1 | 11/2004 | Reiner et al. | |
| 2006/0098616 A1* | 5/2006 | Kish et al. | 370/338 |
| 2007/0211723 A1* | 9/2007 | Patel et al. | 370/392 |
| 2008/0049754 A1* | 2/2008 | Kim et al. | 370/394 |
| 2009/0046631 A1* | 2/2009 | Meylan et al. | 370/328 |
| 2009/0103445 A1* | 4/2009 | Sammour et al. | 370/252 |
| 2010/0070762 A1 | 3/2010 | Reeds, III et al. | |
| 2012/0033579 A1 | 2/2012 | Liao et al. | |

FOREIGN PATENT DOCUMENTS

| | | |
|---|---|---|
| CN | 1842052 A | 10/2006 |
| CN | 1949697 | 4/2007 |
| CN | 101116277 | 1/2008 |
| CN | 101267582 A | 9/2008 |
| CN | 101309099 | 11/2008 |
| CN | 101335603 | 12/2008 |
| EP | 1 056 258 A1 | 11/2000 |
| WO | 2008/147271 | 12/2008 |
| WO | WO 2009/088343 A1 | 7/2009 |
| WO | WO 2009/105053 A2 | 8/2009 |

OTHER PUBLICATIONS

Kliazovich et al., "A Cross-layer Scheme for TCP Performance Improvement in Wireless LANs", IEEE Communications Society Globecom 2004, pp. 840-844.

"3rd Generation Partnership Project; Technical Specification Group Radio Access Network; Radio Link Control (RLC) protocol specification (Release 9)," 3GPP TS 25.322 V9.1.0 (Mar. 2010), Mar. 2010, pp. 1-88.

"Transmission Control Protocol: DARPA Internet Program Protocol Specification," Information Sciences Institute, University of Southern California, (rfc793-TCP), Marina del Ray, California, Sep. 1981, pp. 1-84.

International Search Report issued Apr. 26, 2012 in corresponding International Patent Application No. PCT/CN2012/074770.

Chinese Office Action dated Jun. 30, 2014 in corresponding Chinese Patent Application No. 201110105530.9.

International Search Report mailed Aug. 2, 2012 in corresponding International Application No. PCT/CN2012/074770.

Chinese Office Action dated Feb. 27, 2015 in corresponding Chinese Patent Application No. 201110105530.9.

Office Action issued on Sep. 25, 2015 in corresponding Chinese Patent Application No. 201110105530.9.

* cited by examiner

MESSAGE PROCESSING METHOD, DEVICE, AND SYSTEM

CROSS-REFERENCE TO RELATED APPLICATIONS

This application is a continuation of International Application No. PCT/CN2012/074770, filed on Apr. 26, 2012, which claims priority to Chinese Patent Application No. 201110105530.9, filed on Apr. 26, 2011, both of which are hereby incorporated by reference in their entireties.

TECHNICAL FIELD

The present invention relate to the field of communications technologies, and in particular, to a message processing method, device, and system.

BACKGROUND

When using a packet data service, a mobile user in a 3rd Generation Partnership Project (3rd Generation Partnership Project, 3GPP) network usually uses data transmission functions of a transmission control protocol (Transmission Control Protocol, TCP) and a radio link control (Radio Link Control, RLC) protocol simultaneously.

During service data transmission, a TCP data packet sent by a TCP transmit end is forwarded to a user equipment using a radio access network (Radio Access Network, RAN) device, and the user equipment returns a TCP acknowledgement (ACK) message to an RNC device. Because the TCP data packet is encapsulated in an RLC link into multiple RLC acknowledged mode data protocol data unit(s) (Acknowledged Mode Data Protocol Data Unit, AMD PDU) and then transmitted to the user equipment, the user equipment needs to send an RLC protocol status report (status report) to the user equipment to notify the RNC device that the user equipment has successfully received the RLC protocol AMD PDUs. That is to say, during service data transmission, a large number of TCP ACK and RLC status report data transmission acknowledgements are generated on the user equipment, where the data transmission acknowledgements include duplicate acknowledgements, seriously wasting precious air interface bandwidth and frequency resources.

SUMMARY

Embodiments of the present invention provide a message processing method, device, and system to solve a disadvantage of a serious waste of air interface bandwidth and frequency resources in a service data transmission process.

In one aspect, a message processing method is provided and includes:

receiving a radio link control protocol status report message sent by a user equipment;

obtaining, according to the status report message, identifiers of n first data units received by the user equipment, where the first data units are radio link control protocol acknowledged mode data protocol data units, and the n is a positive integer greater than or equal to 1;

obtaining, according to the identifiers of the n first data units and correspondence between an identifier of a sent transmission control protocol data packet and identifiers of m first data units, an identifier of a transmission data protocol data packet received by the user equipment, where the m is a positive integer greater than or equal to 1, and the identifiers of the m first data units include the identifiers of the n first data units; and determining, according to the identifier of the transmission data protocol data packet received by the user equipment, that the user equipment has received the transmission data protocol data packet corresponding to the identifier of the transmission data protocol data packet.

In one aspect, another message processing method is provided and includes:

receiving an acknowledgement message of a transmission control protocol data packet sent by a user equipment;

obtaining, according to the transmission control protocol data acknowledgement message, an identifier of the transmission control protocol data packet successfully received by the user equipment;

obtaining, according to correspondence between the identifier of the transmission control protocol data packet and at least one identifier of first data units, the identifier of the at least one first data unit corresponding to the identifier of the transmission control protocol data packet, where the first data unit is a radio link control protocol acknowledged mode data protocol data unit; and determining that the user equipment has successfully received the at least one first data unit corresponding to the identifier of the at least one first data unit.

In one aspect, a radio access network device is provided and includes:

a transceiver module, configured to receive a radio link control protocol status report message sent by a user equipment;

a first obtaining module, configured to obtain, according to the status report message received by the transceiver module, identifiers of n first data units received by the user equipment, where the first data units are radio link control protocol acknowledged mode data protocol data units, and the n is a positive integer greater than or equal to 1;

a second obtaining module, configured to obtain, according to the identifiers of the n first data units obtained by the first obtaining module and correspondence between an identifier of a sent transmission control protocol data packet and identifiers of m first data units, an identifier of a transmission data protocol data packet received by the user equipment, where the m is a positive integer greater than or equal to 1, and the identifiers of the m first data units include the identifiers of the n first data units; and a determining module, configured to determine, according to the identifier of the transmission data protocol data packet received by the user equipment, which is obtained by the second obtaining module, that the user equipment has received the transmission data protocol data packet corresponding to the identifier of the transmission data protocol data packet which is obtained by the second obtaining module.

In one aspect, another radio access network device is provided and includes:

a transceiver module, configured to receive a transmission control protocol data acknowledgement message sent by a user equipment;

a first obtaining module, configured to obtain, according to the transmission control protocol data acknowledgement message received by the transceiver module, an identifier of a transmission control protocol data packet successfully received by the user equipment;

a second obtaining module, configured to obtain, according to correspondence between the identifier of the transmission control protocol data packet and an identifier of at least one first data unit, the identifier of the at least one first data unit corresponding to the identifier of the transmission control protocol data packet which is obtained by the first obtaining module, where the first data unit is a radio link control protocol acknowledged mode data protocol data unit; and a determining module, configured to determine that the user equipment has successfully received the at least one first data unit corresponding to the identifier of the at least one first data unit which is obtained by the second obtaining module.

In one aspect, a network communications system is provided and includes a radio access network device and a user equipment, where:

the radio access network device is configured to: receive a radio link control protocol status report message sent by the user equipment; obtain, according to the radio link control protocol status report message, identifiers of n first data units received by the user equipment, where the first data units are radio link control protocol acknowledged mode data protocol data units, and the n is a positive integer greater than or equal to 1; obtain, according to the identifiers of the n first data units and correspondence between an identifier of a sent transmission control protocol data packet and identifiers of m first data units, an identifier of a transmission data protocol data packet received by the user equipment, where the m is a positive integer greater than or equal to 1, and the identifiers of the m first data units include the identifiers of the n first data units; and determine, according to the identifier of the transmission data protocol data packet received by the user equipment, that the user equipment has received the transmission data protocol data packet corresponding to the identifier of the transmission data protocol data packet.

In one aspect, a network communications system is provided and includes a radio access network device and a user equipment, where:

the radio access network device is configured to: receive a transmission control protocol data acknowledgement message sent by the user equipment; obtain, according to the transmission control protocol data acknowledgement message, an identifier of a transmission control protocol data packet successfully received by the user equipment; obtain, according to correspondence between the identifier of the transmission control protocol data packet and an identifier of at least one first data unit, the identifier of the at least one first data unit corresponding to the identifier of the transmission control protocol data packet, where the first data unit is a radio link control protocol acknowledged mode data protocol data unit; and determine that the user equipment has successfully received the at least one first data unit corresponding to the identifier of the at least one first data unit.

By using the message processing method, device, and system in the embodiments of the present invention, when an RLC status report sent by a UE is received, identifiers of n RLC protocol AMD PDUs received by the UE are obtained according to the status report PDU message; an identifier of a TCP data packet received by the UE is obtained according to correspondence between an identifier of a sent TCP data packet and identifiers of m RLC protocol AMD PDUs, and the TCP data packet corresponding to the identifier of the TCP data packet received by the UE is determined. Alternatively, when a TCP data acknowledgement message sent by a UE is received, an identifier of a TCP data packet successfully received by the UE is obtained; an identifier of at least one RLC protocol AMD PDU corresponding to the identifier of the TCP data packet is obtained according to correspondence between the identifier of the TCP data packet and the identifier of the at least one RLC protocol AMD PDU; and it is determined that the UE has received the at least one RLC AMD PDU corresponding to the identifier of the at least one RLC AMD PDU. In comparison with the prior art, by using the technical solutions of the embodiments of the present invention, an RAN device does not need to receive an RLC protocol status report message and a TCP data acknowledgement message simultaneously, thereby saving air interface bandwidth and frequency resources effectively and improving the TCP data packet transmission efficiency. Correspondingly, the UE does not need to send both the TCP data acknowledgement message and the RLC protocol status report message; on the basis of effectively saving air interface bandwidth and frequency resources, power consumption of the UE can be saved effectively, which prolongs the standby and working time of the UE.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

TCP is a transmission protocol defined by the Internet Engineering Task Force (Internet Engineering Task Force, IETF), and is used to transmit data on an IP network. For example, a server in a network is used as a TCP transmit end, and TCP is used to transmit data between the TCP transmit end and a user equipment (a mobile terminal). RLC is a radio link control protocol defined by the 3GPP, and is used to transmit data on an air interface of a mobile network, that is, to forward data from the Internet to the mobile terminal through a radio access network (Radio Access Network, RAN), and forward data sent by the mobile terminal to the Internet through the RAN. For example, the RLC protocol is used to transmit data between the RAN device and the user equipment (User Equipment, UE) representing a mobile terminal.

Figure 1:
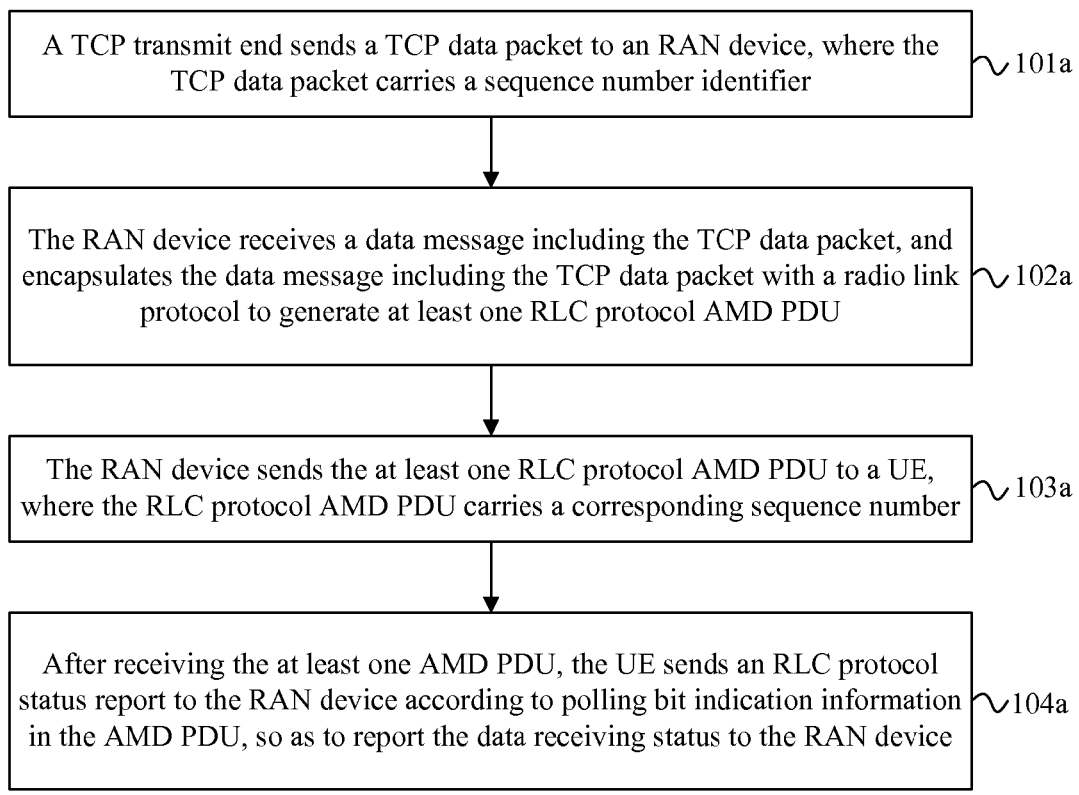
FIG. 1 is a flowchart of data transmission between a TCP transmit end and a UE in a network in the prior art.

FIG. 1 is a flowchart of data transmission between a TCP transmit end and a UE in a network in the prior art. As shown in FIG. 1, the specific transmission procedure is as follows:

101*a*. A TCP transmit end sends a TCP data packet to an RAN device, where the TCP data packet carries a sequence number identifier.

102*a*. The RAN device receives a data message including the TCP data packet, and encapsulates the data message including the TCP data packet with a radio link protocol to generate at least one RLC protocol AMD PDU.

103*a*. The RAN device sends the at least one RLC protocol AMD PDU to a UE, where the RLC protocol AMD PDU carries a corresponding sequence number.

104*a*. After receiving the at least one AMD PDU, the UE sends an RLC protocol status report (status report) to the RAN device according to polling bit indication information in the AMD PDU, so as to report the data receiving status to the RAN device.

For example, the UE receives an RLC protocol AMD PDU carrying a sequence number. An RLC protocol function module of the UE further needs to combine at least one AMD PDU to generate TCP data same as the data sent by the TCP transmit end, and provide the TCP data to a TCP function module of the UE. Afterward, the TCP function module of the UE returns a TCP ACK acknowledgement message to the TCP transmit end through an RNC device, so as to notify the TCP transmit end that the TCP data packet is successfully received.

However, during service data transmission, a large number of TCP ACK and RLC status report data transmission acknowledgements are generated on the user equipment, where the data transmission acknowledgements include duplicate acknowledgements, seriously wasting precious air interface bandwidth and frequency resources.

Figure 2:
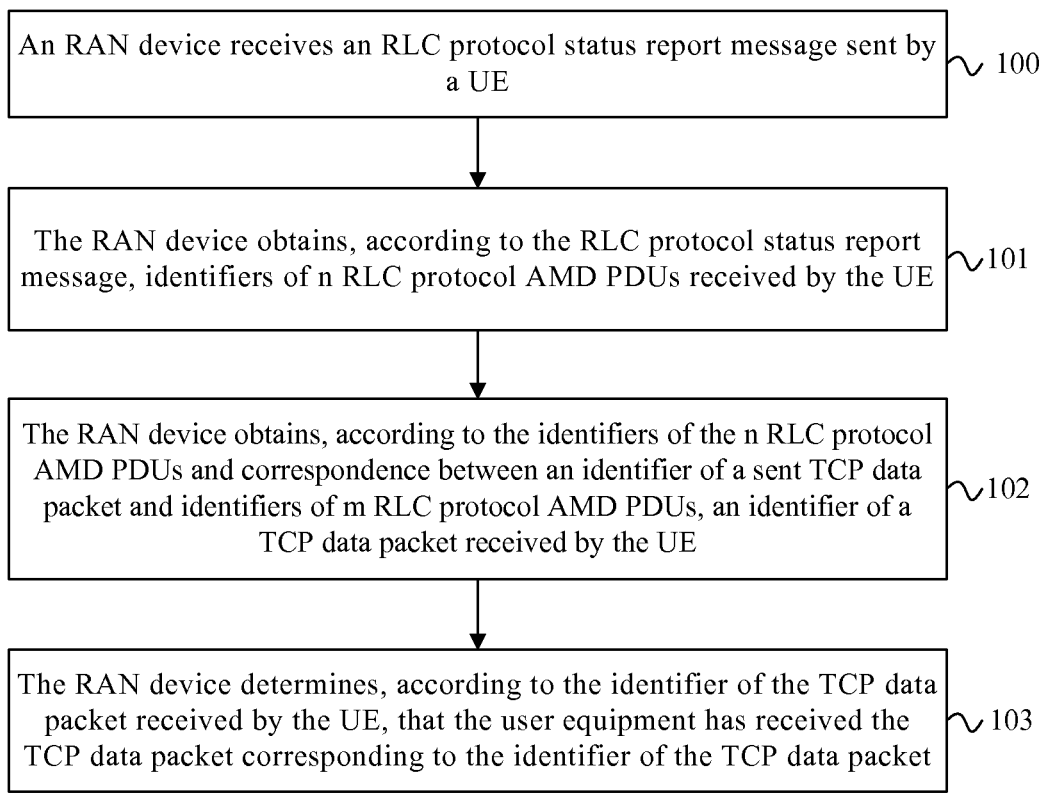
FIG. 2 is a flowchart of a message processing method according to an embodiment of the present invention.

FIG. 2 is a flowchart of a message processing method according to an embodiment of the present invention. As shown in FIG. 2, the executor of the message processing method of the embodiment is an RAN device, which may specifically be, for example, a radio network controller (Radio Network Controller, RNC) or a base station (for example, an eNodeB). The message processing method of this embodiment may be specifically described as follows:

100. An RAN device receives an RLC protocol status report message sent by a UE.

101. The RAN device obtains, according to the RLC protocol status report message, identifiers of n RLC protocol AMD PDUs received by the UE.

The n is a positive integer greater than or equal to 1. For ease of description, the RLC protocol AMD PDUs may also be referred to as first data units.

102. The RAN device obtains, according to the identifiers of the n RLC protocol AMD PDUs and correspondence between an identifier of a sent TCP data packet and identifiers of m RLC protocol AMD PDUs, an identifier of a TCP data packet received by the UE.

103. The RAN device determines, according to the identifier of the TCP data packet received by the UE, that the user equipment has received the TCP data packet corresponding to the identifier of the TCP data packet.

The m is a positive integer greater than or equal to 1, and the identifiers of the m RLC protocol AMD PDUs include the identifiers of the n RLC protocol AMD PDUs. That is to say, the m RLC protocol AMD PDUs include the n RLC protocol AMD PDUs. In other words, m may be equal to n or may also be greater than n.

In the message processing method of the embodiment, an RLC protocol status report message sent by a UE is received; identifiers of n RLC protocol AMD PDUs received by the UE are obtained according to the RLC protocol status report message; an identifier of a TCP data packet received by the UE is obtained according to the identifiers of the n RLC protocol AMD PDUs and correspondence between an identifier of a sent TCP data packet and identifiers of m RLC protocol AMD PDUs; and it is determined that the UE has received the TCP data packet corresponding to the identifier of the TCP data packet. In comparison with the prior art, by using the technical solution of the embodiment, it is no longer necessary to receive a UE-sent acknowledgement message, which indicates that the UE has successfully received TCP data, thereby saving air interface bandwidth and frequency resources effectively and improving the TCP data packet transmission efficiency. Correspondingly, the UE also no longer needs to send the TCP data acknowledgement message. Meanwhile, power consumption of the UE can be saved effectively, which prolongs the standby and working time of the UE.

It should be noted that in step 101 of the foregoing embodiment, identifiers of n RLC protocol AMD PDUs received by the UE are obtained according to the RLC protocol status report message. The specific implementation manner is as follows: After successfully receiving the first data unit sent by the RAN device, the UE returns an RLC protocol status report message to the RAN device according to polling bit indication information set in the first data unit, where the status report message carries an identifier of the next first data unit expected to be received by the UE. Correspondingly, in step 100 of the foregoing embodiment, the RLC protocol status report message received by the RAN device from the UE may carry an identifier of the next first data unit expected to be received by the UE. Thereby, according to the identifier of the next first data unit which is carried in the RLC protocol status report and expected to be received by the UE, the RAN device may obtain identifiers of n first data units that have been successfully received by the UE at this time.

It should be noted that in step 102 of the foregoing embodiment, for the correspondence between the identifier of the sent TCP data packet and identifiers of m RLC protocol AMD PDUs, where the sent TCP data packet may be a TCP data packet. In this case, the m RLC protocol AMD PDUs are m RLC protocol AMD PDUs corresponding to the TCP data packet. For example, when the identifier of the sent TCP data packet is X(i), the identifiers of the corresponding m RLC protocol AMD PDUs are {Y(1), . . . , Y(i), . . . , Y(m)}. If the identifier of the next to-be-received RLC protocol AMD PDU, which is carried in the RLC protocol status report message, is Y(m+1), the RAN device determines that the UE has successfully received RLC protocol AMD PDUs with identifiers Y(1) to Y(m). In this case, the RAN device can determine that the UE has successfully received a TCP data packet with identifier X(i). The foregoing case corresponds to the case that m is equal to n. If the identifier of the next to-be-received RLC protocol AMD PDU, which is carried in the RLC protocol status report message, is Y(i), the RAN device determines that the UE has successfully received RLC protocol AMD PDUs with identifiers Y(1) to Y(i−1), because the RLC protocol AMD PDUs with identifiers Y(1) to Y(i−1) cannot correspond to the TCP data packet with identifier X(i) completely. In this case, the RAN device determines that the TCP data packet successfully received by the UE is still the TCP data packet before the TCP data packet with identifier X(i). The foregoing case corresponds to the case that m is greater than n.

Herein the sent TCP data packet may also be multiple TCP data packets. In this case, the m RLC protocol AMD PDUs are m RLC protocol AMD PDUs corresponding to the multiple TCP data packets. For example, three TCP data packets need to be sent, and their identifiers are X1, X2, and X3 respectively. Identifiers of RLC protocol AMD PDUs corresponding to the TCP data packet with identifier X1 are Y(1) to Y(i), identifiers of RLC protocol AMD PDUs corresponding to the TCP data packet with identifier X2 are Y(i+1) to Y(j), and identifiers of RLC protocol AMD PDUs corresponding to the TCP data packet with identifier X3 are Y(j+1) to Y(m), where Y(1) to Y(i), Y(i+1) to Y(j), and Y(j+1) to Y(m) are m identifiers in total. If the identifier of the next to-be-received RLC protocol AMD PDU, which is carried in the RLC protocol status report message, is Y(m+1), the RAN device determines that the UE has successfully received RLC protocol AMD PDUs with identifiers Y(1) to Y(m). In this case, the RAN device can determine that the UE has successfully received TCP data packets with identifier X(i), X(2) and X(3). The foregoing case corresponds to the case that m is equal to n. If the identifier of the next to-be-received RLC protocol AMD PDU, which is carried in the RLC protocol status report message, is Y(j+1), the RAN device determines that the UE has successfully received RLC protocol AMD PDUs with identifiers Y(1) to Y(j). In this case, the RAN device can determine that the UE has successfully received TCP data packets with identifier X(1) and X(2). If the identifier of the next to-be-received RLC protocol AMD PDU, which is carried in the RLC protocol status report message, is Y(j), the RAN device determines that the UE has successfully received RLC protocol AMD PDUs with identifiers Y(1) to Y(j−1). In this case, because the RLC protocol AMD PDU with identifier Y(j) is not successfully received by the UE, the RAN device can deduce, according to the correspondence, that the UE has not received the TCP data packet with identifier X(2) completely. Therefore, in this case, the RAN device can only determine that the UE has successfully received a TCP data packet with identifier X(1).

Figure 3:
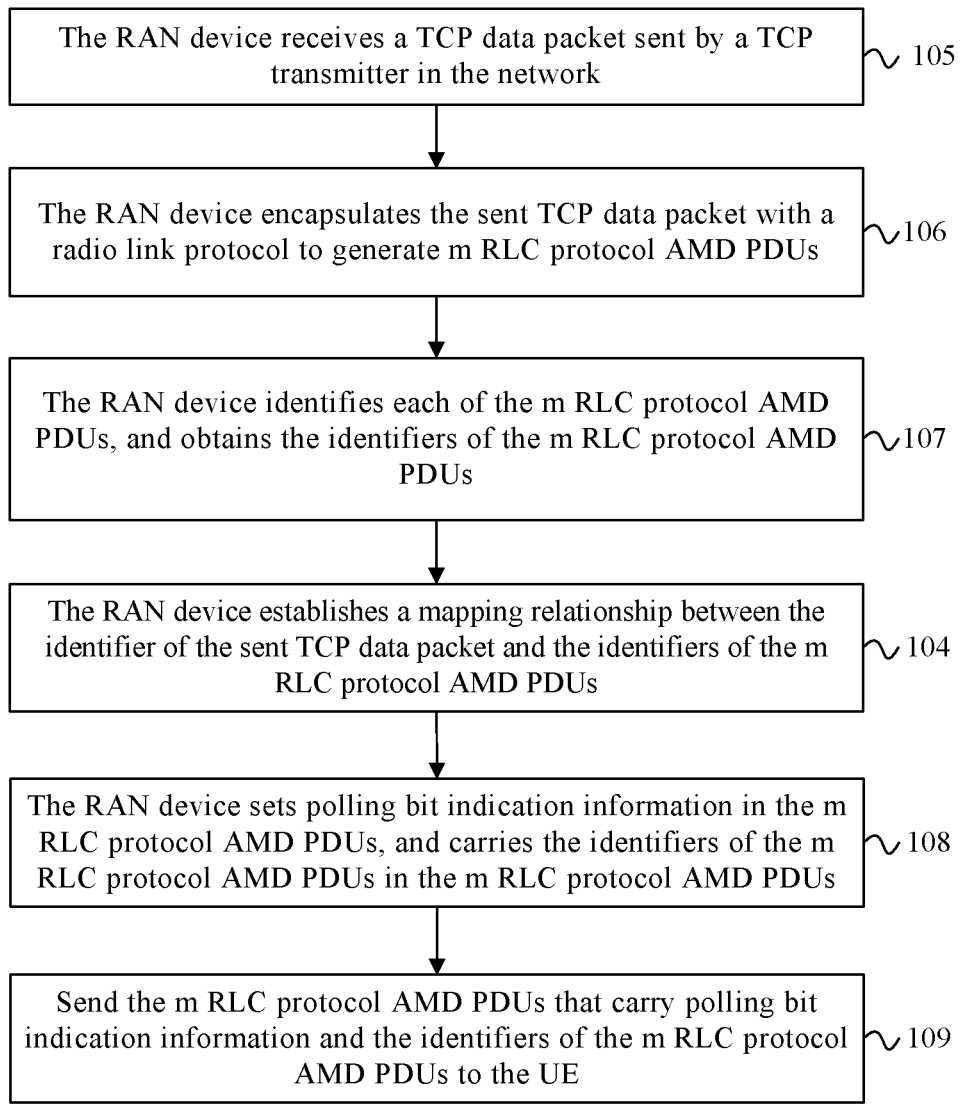
FIG. 3 is a flowchart of a message processing method according to another embodiment of the present invention.

FIG. 3 is a flowchart of a message processing method according to another embodiment of the present invention. As shown in FIG. 3, the message processing method of this embodiment is different from that in the foregoing embodiment shown in FIG. 2 in that the message processing method of this embodiment may specifically further include the following step before step 100 of the foregoing embodiment:

104. The RAN device establishes correspondence between the identifier of the sent TCP data packet and the identifiers of m RLC protocol AMD PDUs.

For example, the correspondence between number X1 of the TCP data packet and numbers {Y1, Y2, Y3, . . . , Yi, . . . , Ym} of at least one RLC protocol AMD PDU may be indicated as: X1 ↔ {Y1, Y2, Y3, . . . , Yi, . . . , Ym}. It should be especially noted that the embodiment does not limit the specific form of the correspondence between numbers.

Optionally, before the foregoing step 104, the method may further include the following steps:

105. The RAN device receives a TCP data packet sent by a TCP transmit end in the network.

The sent TCP data packet carries an identifier of the sent TCP data packet; herein the identifier of the sent TCP data packet may be a number of the TCP data packet, for example, X1.

106. The RAN device encapsulates the sent TCP data packet with a radio link protocol to generate m RLC protocol AMD PDUs.

Herein the sent TCP data packet may be one or multiple packets. When the sent TCP data packet is one packet, m RLC protocol AMD PDUs correspond to the one sent TCP data packet. When the sent TCP data packet is multiple packets, m RLC protocol AMD PDUs always correspond to the multiple sent TCP data packets. For details, reference may be made to related description in the foregoing Embodiment 1.

107. The RAN device identifies each of the m RLC protocol AMD PDUs, and obtains the identifiers of the m RLC protocol AMD PDUs.

Specifically, by using this step, a corresponding identifier may be carried in each of m RLC protocol AMD PDUs, where the identifier may be a number or a sequence number of the RLC protocol AMD PDU. For example, numbers {Y1, Y2, Y3, . . . , Yi, . . . , Ym} of all RLC protocol AMD PDUs of the m RLC protocol AMD PDUs may be obtained.

Optionally, after the foregoing step 104, the method may further include the following steps:

108. The RAN device sets polling bit indication information in the m RLC protocol AMD PDUs, and carries the identifiers of the m RLC protocol AMD PDUs in the m RLC protocol AMD PDUs.

109. Send the m RLC protocol AMD PDUs that carry the polling bit indication information and the identifiers of the m RLC protocol AMD PDUs to the UE.

Carrying the identifiers of the m RLC protocol AMD PDUs in the m RLC protocol AMD PDUs may be carrying a corresponding identifier in each RLC protocol AMD PDU. The polling bit indicator set in the m RLC protocol AMD PDUs is 1. Specifically, in a transmission process, the polling bit indicator 1 may be set in the first and any one in the middle of the m RLC protocol AMD PDUs. Meanwhile, the polling bit indicator in the last RLC protocol AMD PDU also needs to be set to 1. Correspondingly, after receiving the AMD PDU whose polling bit indicator is 1, the UE sends a status report message to the RAN device, to notify the RAN device that the UE has received the RLC protocol AMD PDU. The status report message carries an identifier (namely, a sequence number) of the next RLC protocol AMD PDU expected to be received by the UE, indicating that all RLC protocol AMD PDUs before the identifier have been received by the UE. After the RAN successfully receives the RLC protocol status report message, steps 101-103 in the foregoing Embodiment 1 are executed.

By using the message processing method of this embodiment, only by receiving an RLC protocol status report message may it be determined that the UE has successfully received a TCP data packet, and the UE no longer needs to send a TCP data acknowledgement message to the RAN device, thereby effectively saving air interface bandwidth and frequency resources, and improving the TCP data packet transmission efficiency in the radio network. Meanwhile, power consumption of the UE can be saved effectively, which prolongs the standby and working time of the UE.

It should be noted that after step 104 and before step 105 in the foregoing embodiment, the method may further include: verifying the received TCP data packet to determine whether the TCP data packet is correct. Specifically, after verifying the TCP data packet, the RAN device determines that the TCP data packet is correct, and continues to execute step 105. Otherwise, if the TCP data packet is determined as incorrect after the verification, the TCP data packet is discarded and encapsulation with the radio link protocol is not performed.

It should be noted that on the basis of the foregoing embodiment, in steps 100 and 101, it may be determined that the UE has successfully received n RLC protocol AMD PDUs. Therefore, after step 101 of the foregoing embodiment, the RAN device may release the n RLC protocol AMD PDUs corresponding to the identifiers of the n RLC protocol AMD PDUs in a buffer queue, so as to back up new RLC protocol AMD PDUs.

It should be noted that on the basis of the foregoing embodiment, for example, in step 103, the RAN device may determine that the UE has successfully received the TCP data packet. Therefore, after step 103, the RAN device may send an acknowledgement message indicating that the UE has successfully received the TCP data packet to the TCP transmit end in the network according to the identifier of the TCP data packet received by the UE.

Specifically, when the RAN device obtains, according to step 102, the identifier of the TCP data packet received by the UE, the RAN device sends an acknowledgement message indicating that the UE has successfully the TCP data packet to the TCP transmit end in the network according to the identifier of the TCP data packet and the length of the TCP data packet, and carries an identifier of the next TCP data packet expected to be received by the UE in the acknowledgement message, where the identifier may be obtained by calculation according to the identifier and length of the previous TCP data packet and an existing algorithm. Herein the identifier may be a sequence number included in the TCP data packet.

In the process of sending, by the RAN device according to the identifier of the TCP data packet, an acknowledgement message indicating that the UE has successfully received the TCP data packet to the TCP transmit end in the network, the RAN device may first generate, according to the identifier of the TCP data packet, an acknowledgement message indicating that the UE has successfully received the TCP data packet, and set a source IP address of the acknowledgement message to an IP address of the UE, so that the TCP transmit end may, when receiving the acknowledgement message, consider that the acknowledgement message is sent by the UE. Then the RAN device sends the acknowledgement message with the source IP address being the IP address of the UE to the TCP transmit end, to notify the TCP transmit end that the UE has successfully received the TCP data packet corresponding to the identifier of the TCP data packet. Thereby, after receiving the acknowledgement message, the TCP transmit end may consider that the acknowledgement message is sent by the UE.

Figure 4A:
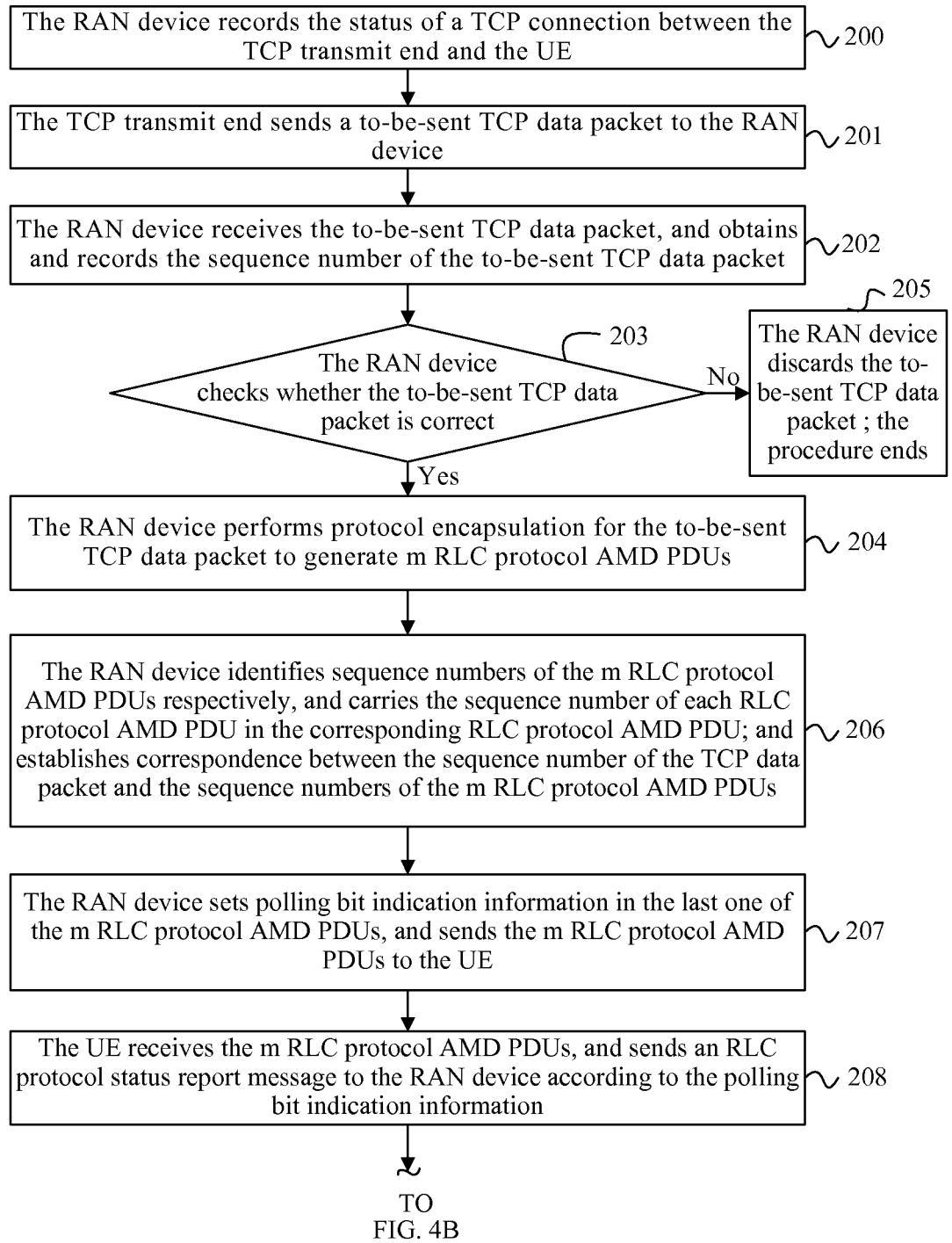
FIG. 4A and FIG. 4B are a flowchart of a message processing method according to still another embodiment of the present invention.
Figure 4B:
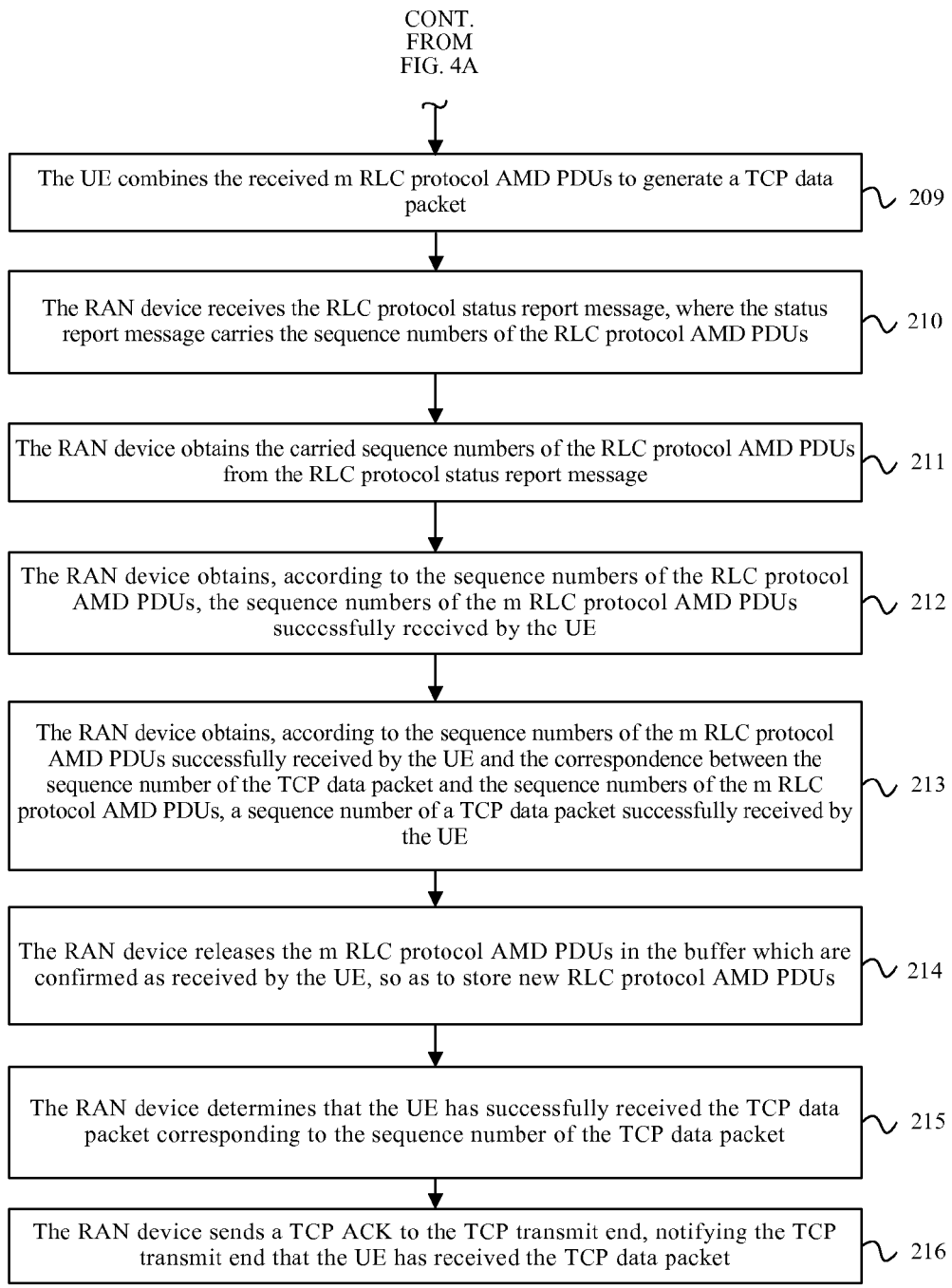
Figure 5:
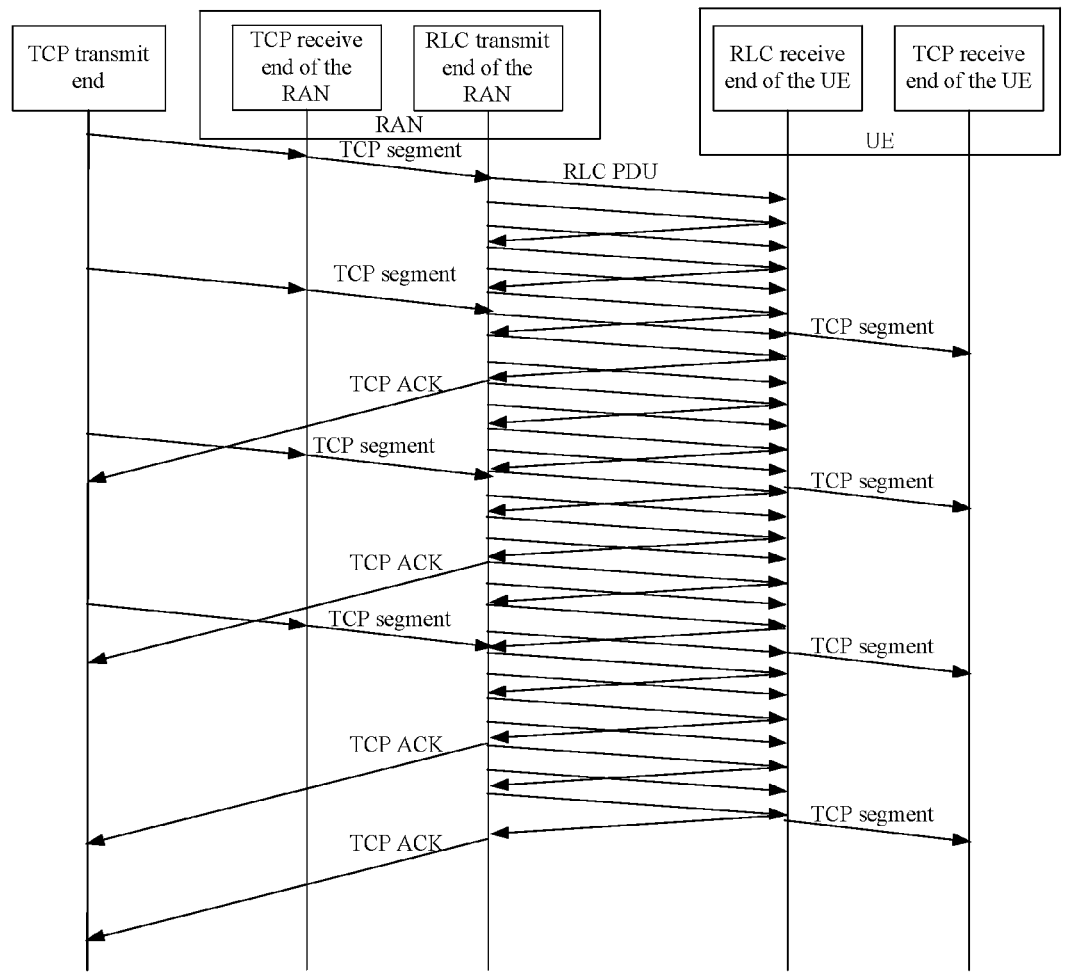
FIG. 5 is a signaling diagram of message sending according to the embodiment shown in FIG. 4A and FIG. 4B.

FIG. 4A and FIG. 4B are a flowchart of a message processing method according to still another embodiment of the present invention. FIG. 5 is a signaling diagram of message sending according to the embodiment shown in FIG. 4A and FIG. 4B. As shown in FIG. 4A and FIG. 4B and FIG. 5, in the embodiment, the technical solution of the present invention is implemented in a network architecture including a TCP transmit end, an RAN device, and a UE. The message processing method of this embodiment may be specifically described as follows:

200. The RAN device records the status of a TCP connection between the TCP transmit end and the UE.

Specifically, the RAN device needs to record the status such as IP addresses, port numbers, and advertised windows of the TCP transmit end and UE. For details, reference may be made to the prior art.

201. The TCP transmit end sends a to-be-sent TCP data packet to the RAN device.

The to-be-sent TCP data packet carries a sequence number of the to-be-sent TCP data packet. The to-be-sent TCP data packet is sent in the form of an IP packet, where an destination IP address of the IP message is an IP address of the UE.

202. The RAN device receives the to-be-sent TCP data packet, and obtains and records the sequence number of the to-be-sent TCP data packet.

203. The RAN device checks whether the to-be-sent TCP data packet is correct. If the to-be-sent TCP data packet is correct, step 204 is executed; if the to-be-sent TCP data packet is incorrect, step 205 is executed.

The to-be-sent TCP data packet includes a checksum field, which is filled after calculation by the transmit end of the to-be-sent TCP data packet. The RAN device may recalculate the checksum of the content of the TCP data packet and the IP address of the IP header according to an algorithm same as that for the TCP transmit end, and then compare the checksum with the checksum field included in the to-be-sent TCP data packet. If they are the same, the to-be-sent TCP data packet is verified as correct, or if they are different, a verification error occurs. For details, reference may be made to record in the prior art, and details are not further described herein.

204. The RAN device performs protocol encapsulation for the to-be-sent TCP data packet to generate m RLC protocol AMD PDUs; then step 206 is executed.

205. The RAN device discards the to-be-sent TCP data packet. The procedure ends.

206. The RAN device identifies sequence numbers of the m RLC protocol AMD PDUs respectively, and carries the sequence number of each RLC protocol AMD PDU in the corresponding RLC protocol AMD PDU; and establishes correspondence between the sequence number of the TCP data packet and the sequence numbers of the m RLC protocol AMD PDUs; then step 207 is executed.

The carrying the sequence number of each RLC protocol AMD PDU in the corresponding RLC protocol AMD PDU may be executed after the correspondence is established.

207. The RAN device sets polling bit indication information in the last one of the m RLC protocol AMD PDUs, and sends the m RLC protocol AMD PDUs to the UE; then step 208 is executed.

For details, reference may be made to record in the prior art where polling bit indication information is set in the RLC protocol AMD PDU. Here is an example where the polling bit indication information is set in the last one of the m RLC protocol AMD PDUs. The m RLC protocol AMD PDUs carry the polling bit indication information and the identifiers of the m RLC protocol AMD PDUs.

As shown in FIG. 5, the RAN device in this embodiment is equivalent to integration of two entities: a TCP forwarder and an RLC protocol transmitter.

208. The UE receives the m RLC protocol AMD PDUs, and sends an RLC protocol status report message to the RAN device according to the polling bit indication information; then step 209 is executed.

209. The UE combines the received m RLC protocol AMD PDUs to generate a TCP data packet; then step 210 is executed.

In this case, the TCP data packet generated by the combination is the same as the TCP data packet sent by the TCP transmit end to the RAN device in step 201. The UE may consider that the TCP data packet is sent by the TCP transmit end through the RAN device.

As shown in FIG. 5, the UE in this embodiment finally receives the m RLC protocol AMD PDUs, and combines the m RLC protocol AMD PDUs according to a process reverse to encapsulation to generate a TCP data packet. Thereby, the UE may be equivalent to two functional entities: an RLC receiver and a TCP receiver.

210. The RAN device receives the RLC protocol status report message, where the status report message carries the sequence numbers of the RLC protocol AMD PDUs; then step 211 is executed.

211. The RAN device obtains the sequence numbers of the RLC protocol AMD PDUs from the RLC protocol status report message; then step 212 is executed.

212. The RAN device obtains, according to the sequence numbers of the RLC protocol AMD PDUs, the sequence numbers of the m RLC protocol AMD PDUs successfully received by the UE; then step 213 is executed.

213. The RAN device obtains, according to the sequence numbers of the m RLC protocol AMD PDUs successfully received by the UE and the correspondence between the sequence number of the TCP data packet and the sequence numbers of the m RLC protocol AMD PDUs, a sequence number of a TCP data packet successfully received by the UE; then step 214 is executed.

The correspondence between the sequence number of the TCP data packet and the sequence numbers of the m RLC protocol AMD PDUs is the correspondence established in step 206.

214. The RAN device releases the m RLC protocol AMD PDUs in the buffer which are confirmed as received by the UE, so as to store new RLC protocol AMD PDUs; then step 215 is executed.

Step 214 may also be executed after step 212 and before step 213.

215. The RAN device determines that the UE has successfully received the TCP data packet corresponding to the sequence number of the TCP data packet; then step 216 is executed.

216. The RAN device sends a TCP ACK to the TCP transmit end, notifying the TCP transmit end that the UE has received the TCP data packet.

It should be noted that herein when the RAN device sends a TCP ACK to the TCP transmit end, the RAN device first generates a TCP ACK according to the identifier of the TCP data packet that has been received by the UE. Then the RAN device may set the source IP address in the TCP ACK to the address of the UE, and then send the TCP ACK to the TCP transmit end. Thereby, the TCP transmit end may consider that the TCP ACK is sent by the UE.

The message processing method of this embodiment uses the technical solution of the foregoing embodiment, and the UE no longer needs to return a TCP ACK to the RAN device, thereby saving air interface bandwidth and frequency resources effectively and improving the TCP data packet transmission efficiency. Meanwhile, power consumption of the UE can be saved effectively, which prolongs the standby and working time of the UE.

Figure 6:
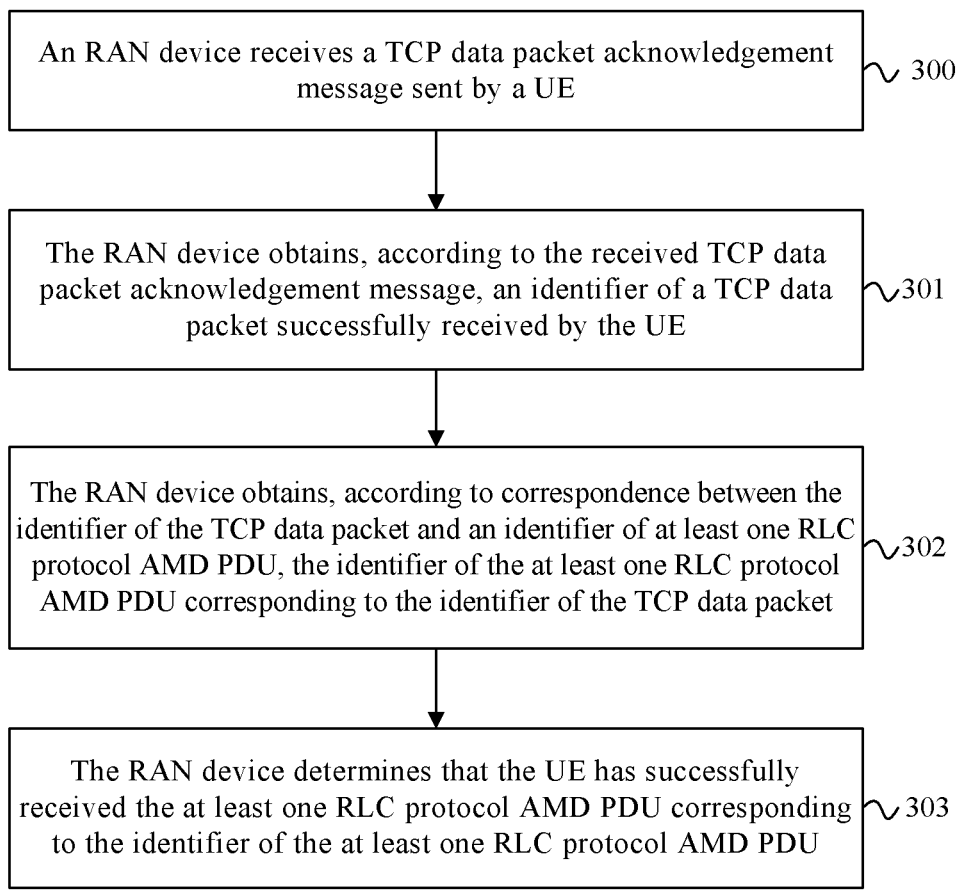
FIG. 6 is a flowchart of a message processing method according to yet another embodiment of the present invention.

FIG. 6 is a flowchart of a message processing method according to yet another embodiment of the present invention. As shown in FIG. 6, the executor of the message processing method of this embodiment is an RAN device, which may specifically be, for example, an RNC or an eNodeB. The message processing method of this embodiment may specifically include the following steps:

300. An RAN device receives a TCP data acknowledgement message sent by a UE.

301. The RAN device obtains, according to the received TCP data acknowledgement message, an identifier of a TCP data packet successfully received by the UE.

Specifically, the UE-sent acknowledgement message, which indicates that the UE has successfully received the TCP data packet, carries an identifier of a next to-be-received TCP data packet. A TCP server may determine, according to the identifier of the next to-be-received TCP data packet which is carried in the received acknowledgement message, the identifier of the TCP data packet successfully received by the UE currently. For details, reference may be made to the prior art. The TCP data acknowledgement message may be a separate acknowledgement message, that is, a message including only acknowledgement information but not message content. The data message may also include acknowledgement information, and an acknowledgement parameter is used. Specifically, the TCP data acknowledgement message may also be in other forms, which are not limited by the technical solution of the present invention.

302. The RAN device obtains, according to correspondence between the identifier of the TCP data packet and an identifier of at least one RLC protocol AMD PDU, the identifier of the at least one RLC protocol AMD PDU corresponding to the identifier of the TCP data packet.

303. The RAN device determines that the UE has successfully received the at least one RLC protocol AMD PDU corresponding to the identifier of the at least one RLC protocol AMD PDU.

Specifically, this embodiment also takes a TCP data packet as an example to describe the technical solution of the present invention. The difference between this embodiment and the foregoing Embodiment 1 lies in that: in this embodiment, the RAN device receives a UE-sent acknowledgement message sent by the UE, which indicates that the UE has successfully received TCP data; then obtains, according to the TCP data acknowledgement message, an identifier of a TCP data packet successfully received by the UE; then obtains, according to the correspondence between the identifier of the TCP data packet and the identifier of at least one RLC protocol AMD PDU, the identifier of the at least one RLC protocol AMD PDU corresponding to the identifier of the TCP data packet; and thereby determines that the UE has successfully received the at least one RLC protocol AMD PDU corresponding to the identifier of the at least one RLC protocol AMD PDU. For ease of description, the RLC protocol AMD PDU in this embodiment may also be referred to as a first data unit.

By using the message processing method of this embodiment, when receiving a TCP data acknowledgement message sent by the UE, the RAN device obtains an identifier of a TCP data packet successfully received by the UE, and determines, according to correspondence between the identifier of the TCP data packet and an identifier of at least one RLC protocol AMD PDU, that the UE has successfully received the at least one RLC protocol AMD PDU corresponding to the identifier of the at least one RLC protocol AMD PDU. In comparison with the prior art, by using the technical solution of this embodiment, the RAN device no longer needs to receive an RLC protocol status report message sent by the UE, thereby saving air interface bandwidth and frequency resources effectively and improving the TCP data packet transmission efficiency. Correspondingly, the UE also no longer needs to send the RLC protocol status report message; on the basis of effectively saving air interface bandwidth and frequency resources, power consumption of the UE can be saved effectively, which prolongs the standby and working time of the UE.

Figure 7:
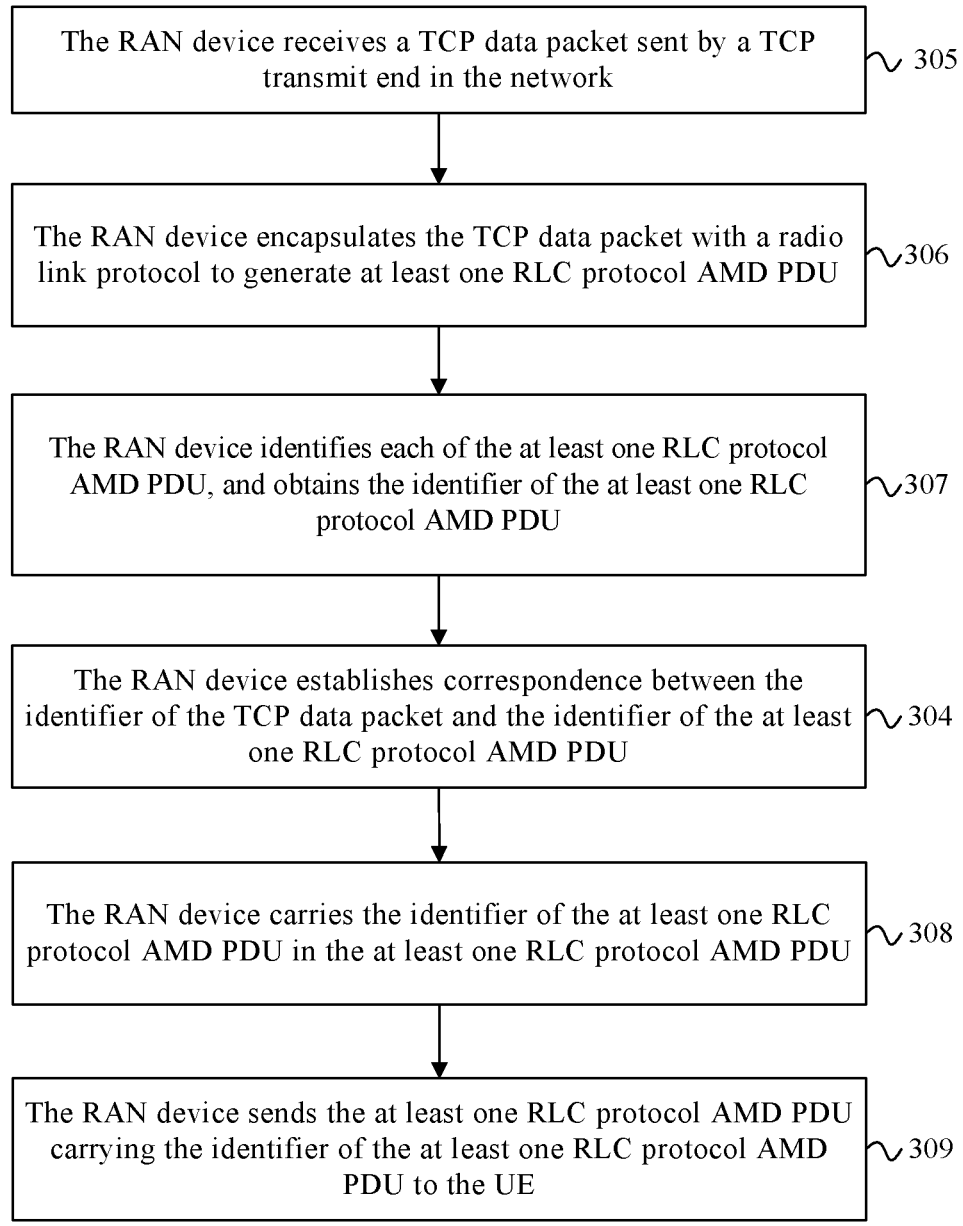
FIG. 7 is a flowchart of a message processing method according to still another embodiment of the present invention.

FIG. 7 is a flowchart of a message processing method according to still another embodiment of the present invention. As shown in FIG. 7, the message processing method of this embodiment is different from that in the foregoing embodiment shown in FIG. 6 in that: the message processing method of this embodiment may further include the following step before step 300 of the foregoing embodiment:

304. The RAN device establishes correspondence between the identifier of the TCP data packet and the identifier of at least one RLC protocol AMD PDU.

Optionally, before step 304, the method may further include the following steps:

305. The RAN device receives a TCP data packet sent by a TCP transmit end in the network.

The TCP data packet carries an identifier of the TCP data packet, where the identifier may be a sequence number or a number.

306. The RAN device encapsulates the TCP data packet with a radio link protocol to generate at least one RLC protocol AMD PDU.

307. The RAN device identifies each of the at least one RLC protocol AMD PDU, and obtains the identifier of the at least one RLC protocol AMD PDU.

Herein the identifier of the RLC protocol AMD PDU is also a sequence number or a number.

Optionally, after step 304, the method may further include the following steps:

308. The RAN device carries the identifier of the at least one RLC protocol AMD PDU in the at least one RLC protocol AMD PDU.

309. The RAN device sends the at least one RLC protocol AMD PDU carrying the identifier of the at least one RLC protocol AMD PDU to the UE.

Specifically, for each step in the message processing method of this embodiment, reference may be made to similar steps in the embodiment shown in FIG. 3. The difference is that in this embodiment, all polling bit indicators in the RLC protocol AMD PDUs sent to the UE are set to 0, that is, the RAN device does not require the UE to proactively feed back a status report message to the RAN device in normal cases after the UE has successfully received the RLC protocol AMD PDUs. For more information, reference may be made to record in the embodiment shown in FIG. 3.

The message processing method of this embodiment can save air interface bandwidth and frequency resources effectively and improve the TCP data packet transmission efficiency in the radio network. Meanwhile, power consumption of the UE can be saved effectively, which prolongs the standby and working time of the UE.

It should be noted that on the basis of the foregoing embodiment, for example, in step 300, the RAN device may determine that the UE has successfully received the TCP data packet. Therefore, after step 300, the RAN device may forward an acknowledgement message indicating that the TCP data has been received in step 300 to the TCP transmit end in the network according to the identifier of the TCP data packet.

It should be noted that on the basis of the foregoing embodiment, in step 303, it may be determined that the UE has successfully received at least one RLC protocol AMD PDU. Therefore, after step 303 of the foregoing embodiment, the RAN device may release the at least one RLC protocol AMD PDU corresponding to the identifier of the at least one RLC protocol AMD PDU in the buffer queue, so as to store a new RLC protocol AMD PDU.

Figure 8A:
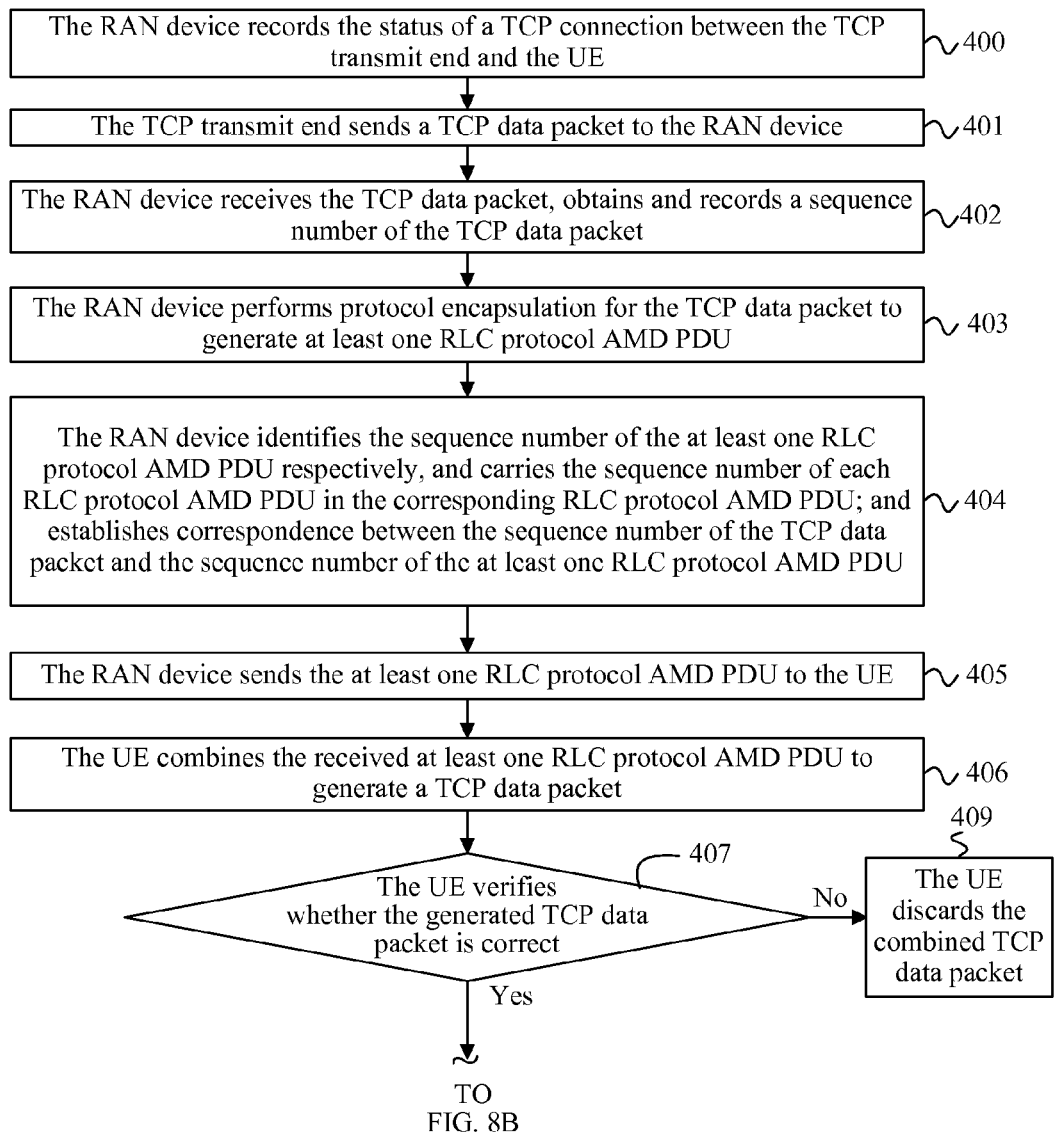
FIG. 8A and FIG. 8B are a flowchart of a message processing method according to yet another embodiment of the present invention.
Figure 8B:
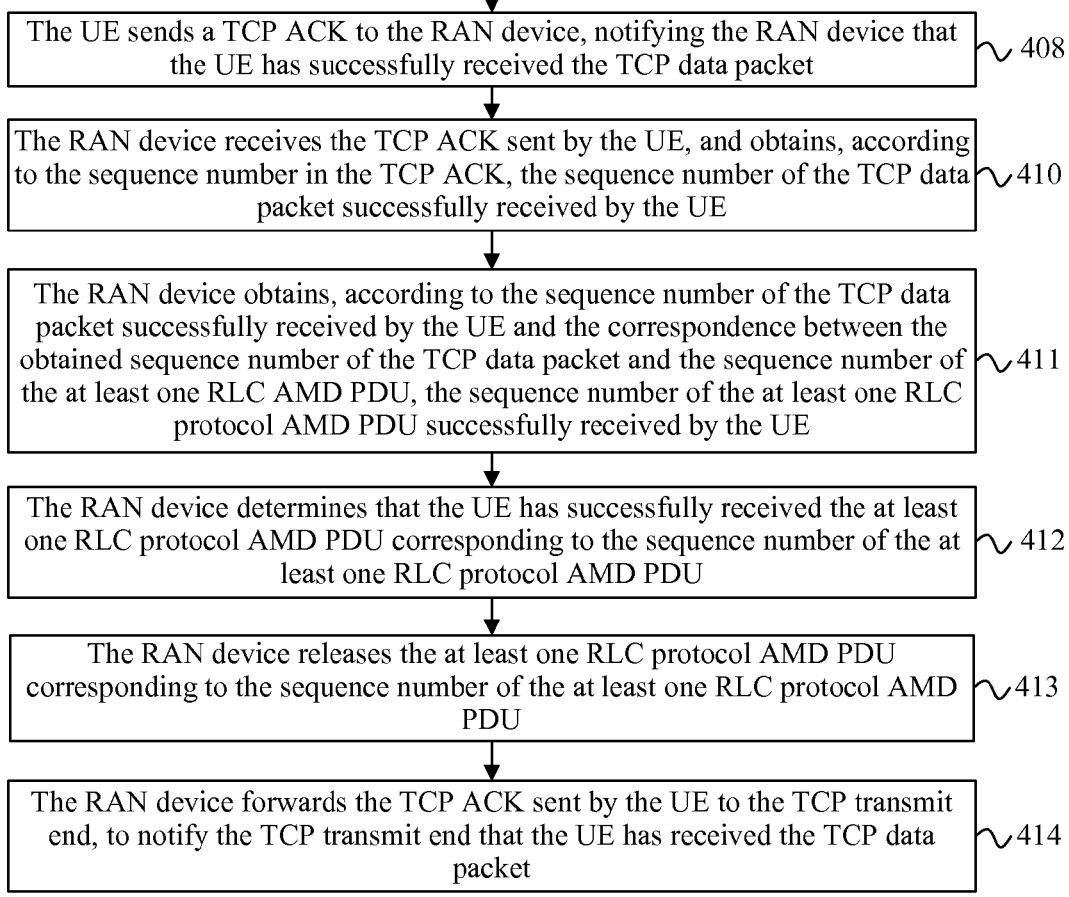
Figure 9:
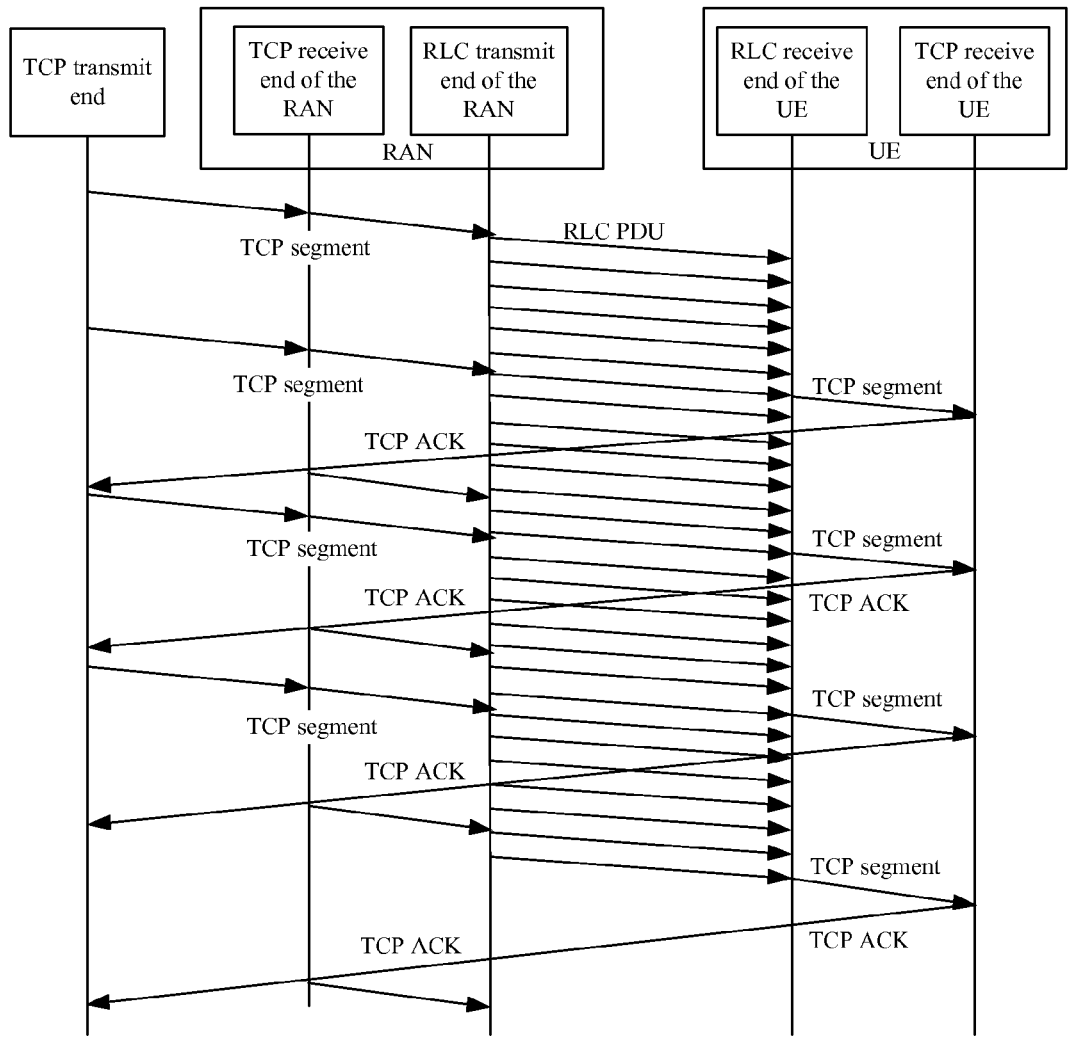
FIG. 9 is a signaling diagram of message sending according to the embodiment shown in FIG. 8A and FIG. 8B.

FIG. 8A and FIG. 8B are a flowchart of a message processing method according to yet another embodiment of the present invention. FIG. 9 is a signaling diagram of message sending according to the embodiment shown in FIG. 8A and FIG. 8B. As shown in FIG. 8A and FIG. 8B and FIG. 9, in the embodiment, the technical solution of the present invention is implemented in a network architecture including a TCP transmit end, an RAN device, and a UE. The message processing method of this embodiment may specifically include the following steps:

400. The RAN device records the status of a TCP connection between the TCP transmit end and the UE; then step 401 is executed.

401. The TCP transmit end sends a TCP data packet to the RAN device; then step 402 is executed.

402. The RAN device receives the TCP data packet, and obtains and records a sequence number of the TCP data packet; then step 403 is executed.

403. The RAN device performs protocol encapsulation for the TCP data packet to generate at least one RLC protocol AMD PDU; then step 404 is executed.

404. The RAN device identifies the sequence number of the at least one RLC protocol AMD PDU respectively, and carries the sequence number of each RLC protocol AMD PDU in the corresponding RLC protocol AMD PDU; and establishes correspondence between the sequence number of the TCP data packet and the sequence number of the at least one RLC protocol AMD PDU; then step 405 is executed.

The carrying the sequence number of each RLC protocol AMD PDU in the corresponding RLC protocol AMD PDU may also be performed after the correspondence is established.

405. The RAN device sends the at least one RLC protocol AMD PDU to the UE; then step 406 is executed.

In this case, all polling bit indicators in the RLC protocol AMD PDUs are set to 0, and the UE does not need to return an RLC protocol status report message. The at least one RLC protocol AMD PDU carries the sequence number of the at least one RLC protocol AMD PDU.

As shown in FIG. 9, the RAN device of this embodiment is equivalent to two entities: a TCP forwarder and an RLC protocol transmitter.

406. The UE combines the received at least one RLC protocol AMD PDU to generate a TCP data packet; then step 407 is executed.

In this case, the TCP data packet generated by the combination is the same as the TCP data packet sent by the TCP transmit end to the RAN device in step 401.

407. The UE verifies whether the generated TCP data packet is correct, and if the generated TCP packet is correct, step 408 is executed; the generated TCP packet is incorrect, step 409 is executed.

408. The UE sends a TCP ACK to the RAN device, notifying the RAN device that the UE has successfully received the TCP data packet; then step 410 is executed.

The TCP ACK is sent in the form of an IP message, where the destination IP address of the IP message is an IP address of the TCP transmit end.

As shown in FIG. 9, the UE in this embodiment may also be equivalent to two functional entities: an RLC receiver and a TCP receiver.

409. The UE discards the generated TCP data packet. The procedure ends.

410. The RAN device receives the TCP ACK sent by the UE, and obtains, according to the sequence number in the TCP ACK, the sequence number of the TCP data packet successfully received by the UE; then step 411 is executed.

411. The RAN device obtains, according to the sequence number of the TCP data packet successfully received by the UE and the correspondence between the obtained sequence number of the TCP data packet and the sequence number of the at least one RLC AMD PDU, the sequence number of the at least one RLC protocol AMD PDU successfully received by the UE; then step 412 is executed.

412. The RAN device determines that the UE has successfully received the at least one RLC protocol AMD PDU corresponding to the sequence number of the at least one RLC protocol AMD PDU; then step 413 is executed.

413. The RAN device releases the at least one RLC protocol AMD PDU corresponding to the sequence number of the at least one RLC protocol AMD PDU in the buffer; then step 414 is executed.

414. The RAN device forwards the TCP ACK sent by the UE to the TCP transmit end, to notify the TCP transmit end that the UE has received the TCP data packet.

By using the message processing method of this embodiment, the UE no longer needs to return an RLC PDU status report message to the RAN device, thereby saving air interface bandwidth and frequency resources effectively and improving the TCP data packet transmission efficiency. Meanwhile, power consumption of the UE can be saved effectively, which prolongs the standby and working time of the UE.

Figure 10:
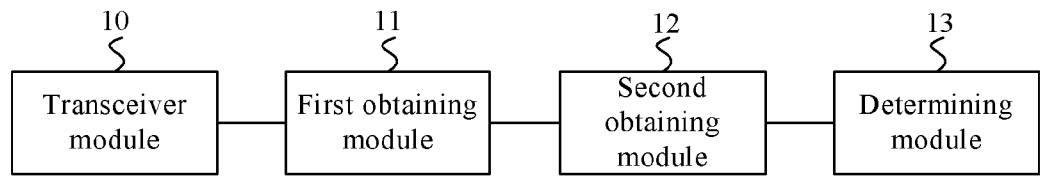
FIG. 10 is a schematic structural diagram of an RAN device according to an embodiment of the present invention.

FIG. 10 is a schematic structural diagram of an RAN device according to an embodiment of the present invention. As shown in FIG. 10, the RAN device of this embodiment includes: a transceiver module 10, a first obtaining module 11, a second obtaining module 12, and a determining module 13.

The transceiver module 10 is configured to receive an RLC protocol status report message sent by a UE. The first obtaining module 11 is connected to the transceiver module 10 and the first obtaining module 11 is configured to obtain, according to the RLC protocol status report message received by the transceiver module 10, identifiers of n first data units received by the UE, where the first data units are RLC protocol AMD PDUs, and the n is a positive integer greater than or equal to 1. The second obtaining module 12 is connected to the obtaining module 11 and the second obtaining module 12 is configured to obtain, according to the identifiers of the n first data units obtained by the first obtaining module 11 and correspondence between an identifier of a sent TCP data packet and identifiers of m first data units, an identifier of a TCP data packet received by the UE, where the m is a positive integer greater than or equal to 1, and the identifiers of the m first data units include the identifiers of the n first data units, that is, the identifiers of the m RLC protocol AMD PDUs include identifiers of n RLC protocol AMD PDUs. The determining module 13 is connected to the second obtaining module 12 and configured to determine, according to the identifier of the TCP data packet received by the UE, which is obtained by the second obtaining module 12, that the UE has successfully received the TCP data packet corresponding to the identifier of the TCP data packet received by the UE, which is obtained by the second obtaining module 12.

In the RAN device of this embodiment, message processing implemented by using the foregoing modules is the same as an implementation mechanism of a foregoing related method embodiment. For details, reference may be made to the record of the related method embodiment, and the message processing is not further described herein.

By using the foregoing modules in the RAN device of this embodiment, the following is implemented: an RLC protocol status report message sent by a UE is received; identifiers of n RLC protocol AMD PDUs received by the UE are obtained according to the RLC protocol status report message; an identifier of a TCP data packet received by the UE is obtained according to the identifiers of the n RLC protocol AMD PDUs and correspondence between an identifier of a sent TCP data packet and identifiers of m RLC protocol AMD PDUs; and it is determined that the UE has received the TCP data packet corresponding to the identifier of the TCP data packet. In comparison with the prior art, by using the technical solution of this embodiment, the RAN device no longer needs to receive a US-sent acknowledgement message, which indicates that the UE has successfully received TCP data, thereby saving air interface bandwidth and frequency resources effectively and improving the TCP data packet transmission efficiency. Correspondingly, the UE also no longer needs to send the TCP data acknowledgement message; on the basis of effectively saving air interface bandwidth and frequency resources, power consumption of the UE can be saved effectively, which prolongs the standby and working time of the UE.

Figure 11:
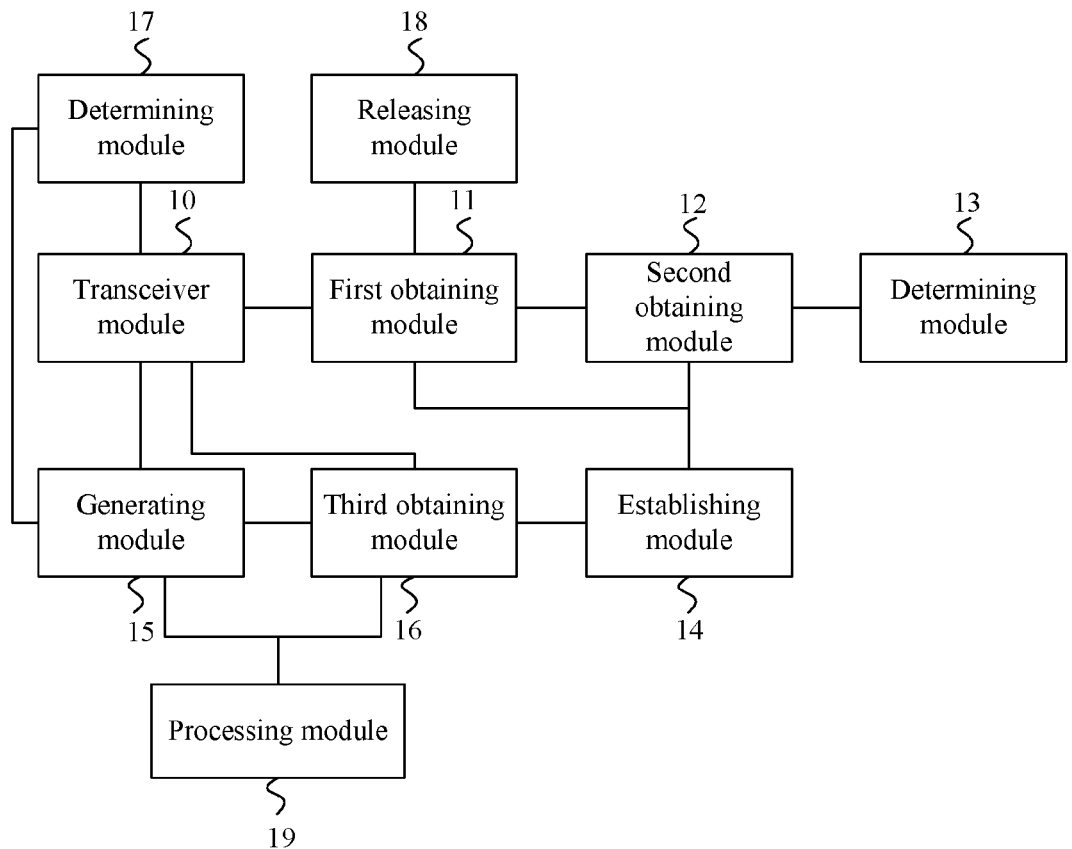
FIG. 11 is a schematic structural diagram of an RAN device according to another embodiment of the present invention.

FIG. 11 is a schematic structural diagram of an RAN device according to another embodiment of the present invention. As shown in FIG. 11, the RAN device of this embodiment is similar to the embodiment shown in the foregoing FIG. 10, and the difference lies in that the RAN device of this embodiment further includes an establishing module 14 on the basis of the embodiment shown in the foregoing FIG. 10. The establishing module 14 is configured to establish the correspondence between the identifier of the TCP data packet obtained by the first obtaining module 11 and the identifiers of the m first data units obtained by the second obtaining module 12. In this case, the obtaining module 11 and second obtaining module 12 are connected to the establishing module 14. The second obtaining module 12 is configured to obtain, according to the correspondence established by the establishing module 14 and the identifiers of the n first data units obtained by the first obtaining module 11, the identifier of the TCP data packet received by the UE.

Optionally, the RAN device of this embodiment may further include a generating module 15, a third obtaining module 16, and a processing module 19.

The transceiver module 10 in this embodiment is further configured to receive a TCP data packet sent by a TCP transmit end, where the sent TCP data packet carries an identifier of the sent TCP data packet. The generating module 15 is connected to the transceiver module 10 and configured to encapsulate the sent TCP data packet received by the transceiver module 10, with a radio link protocol, to generate the m first data units. The third obtaining module 16 is connected to the generating module 15 and the third obtaining module 16 is configured to identify each of the m first data units generated by the generating module 15, and obtain identifiers of the m first data units. In this case, the establishing module 14 is connected to the transceiver module 10 and third obtaining module 16 respectively, and the establishing module 14 is configured to establish correspondence between the identifier of the TCP data packet received by the transceiver module 10 and the identifiers of the m first data units obtained after processing by the third obtaining module 16. The processing module 19 is configured to set polling bit indication information in the m first data units generated by the generating module 15, and carry, in the m first data units, the identifiers of the m first data units obtained by the third obtaining module 16. The transceiver module 10 is further connected to the processing module 19 and the transceiver module 10 is configured to send the UE the m first data units carrying the polling bit indication information and the identifiers of the m first data units obtained by the third obtaining module 16, which are processed by the processing module 19, that is, to send the UE m RLC protocol AMD PDUs carrying the polling bit indication information and identifiers of the m RLC protocol AMD PDUs. Each RLC protocol AMD PDU carries an identifier of an RLC protocol AMD PDU, and the polling bit indication information may indicate that a polling bit indicator is set in one or multiple RLC protocol AMD PDUs.

It should be noted that the RAN device of this embodiment may further include a determining module 17, where the determining module 17 is connected to the transceiver module 10 and generating module 15 respectively. The determining module 17 is configured to verify the TCP data packet received by the transceiver module 10 to determine whether the TCP data packet is correct, and then the determining module 17 triggers the generating module 15 to encapsulate the TCP data packet received by the transceiver module 10, with a radio link protocol.

It should be noted that the RAN device of this embodiment further includes a releasing module 18. The releasing module 18 is connected to the first obtaining module 11, and the releasing module 18 is configured to release, according to the identifiers of the n first data units received by the UE, which are obtained by the first obtaining module 11, the n first data units corresponding to the identifiers of the n first data units in the buffer queue.

The processing module 19 in the RAN device of this embodiment is configured to generate, according to the identifier of the TCP data packet obtained by the second obtaining module 12, an acknowledgement message indicating that the UE has successfully received the TCP data packet, and set a source IP address of the generated acknowledgement message to an IP address of the UE. The transceiver module 10 is configured to send the acknowledgement message that is obtained after processing by the processing module 19, with the source IP address being the IP address of the UE, to the TCP transmit end.

In the RAN device of this embodiment, message processing implemented by using the foregoing modules is the same as an implementation mechanism of a foregoing related method embodiment. For details, reference may be made to the record of the related method embodiment, and the message processing is not further described herein.

By using the foregoing modules in the RAN device of this embodiment, the following is implemented: only by receiving an RLC protocol status report message, it may be determined that the UE has successfully received a TCP data packet, thereby saving air interface bandwidth and frequency resources effectively and improving the TCP data packet transmission efficiency in the radio network. Meanwhile, power consumption of the UE can be saved effectively, which prolongs the standby and working time of the UE.

Figure 12:
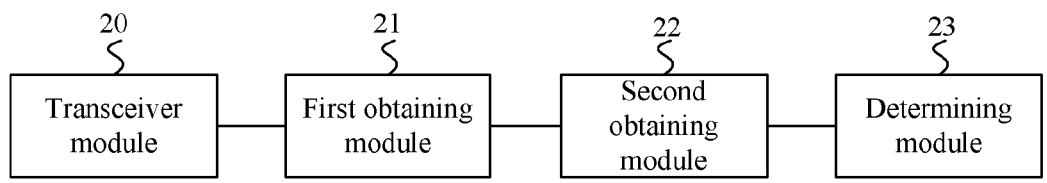
FIG. 12 is a schematic structural diagram of an RAN device according to still another embodiment of the present invention.

FIG. 12 is a schematic structural diagram of an RAN device according to still another embodiment of the present invention. As shown in FIG. 12, the RAN device of this embodiment may specifically include: a transceiver module 20, a first obtaining module 21, a second obtaining module 22, and a determining module 23.

The transceiver module 20 is configured to receive a TCP data acknowledgement message sent by a UE. The first obtaining module 21 is connected to the transceiver module 20 and the first obtaining module 21 is configured to obtain, according to the TCP data acknowledgement message received by the transceiver module 20, an identifier of a TCP data packet successfully received by the UE. The second obtaining module 22 is connected to the first obtaining module 21 and the second obtaining module 22 is configured to obtain, according to correspondence between the identifier of the TCP data packet and an identifier of at least one first data unit, the identifier of the at least one first data unit corresponding to the identifier of the TCP data packet which is obtained by the first obtaining module 21, where the first data unit is an RLC protocol AMD PDU. The determining module 23 is connected to the second obtaining module 22 and the determining module 23 is configured to determine, according to the identifier of the at least one first data unit corresponding to the identifier of the TCP data packet, which is obtained by the second obtaining module 22, that the UE has successfully received the at least one first data unit corresponding to the identifier of the at least one first data unit.

In the RAN device of this embodiment, message processing implemented by using the foregoing modules is the same as an implementation mechanism of a foregoing related method embodiment. For details, reference may be made to the record of the related method embodiment, and the message processing is not further described herein.

By using the foregoing modules in the RAN device of this embodiment, the following is implemented: when receiving a TCP data acknowledgement message sent by the UE, the RAN device obtains an identifier of a TCP data packet successfully received by the UE, and determines, according to correspondence between the identifier of the TCP data packet and an identifier of at least one RLC protocol AMD PDU, that the UE has successfully received the at least one RLC protocol AMD PDU corresponding to the identifier of the at least one RLC protocol AMD PDU. In comparison with the prior art, by using the technical solution of the embodiment of the present invention, the RAN device no longer needs to receive an RLC protocol status report message sent by the UE, thereby saving air interface bandwidth and frequency resources effectively and improving the TCP data packet transmission efficiency. Correspondingly, the UE also no longer needs to send the RLC protocol status report message; on the basis of effectively saving air interface bandwidth and frequency resources, power consumption of the UE can be saved effectively, which prolongs the standby and working time of the UE.

Figure 13:
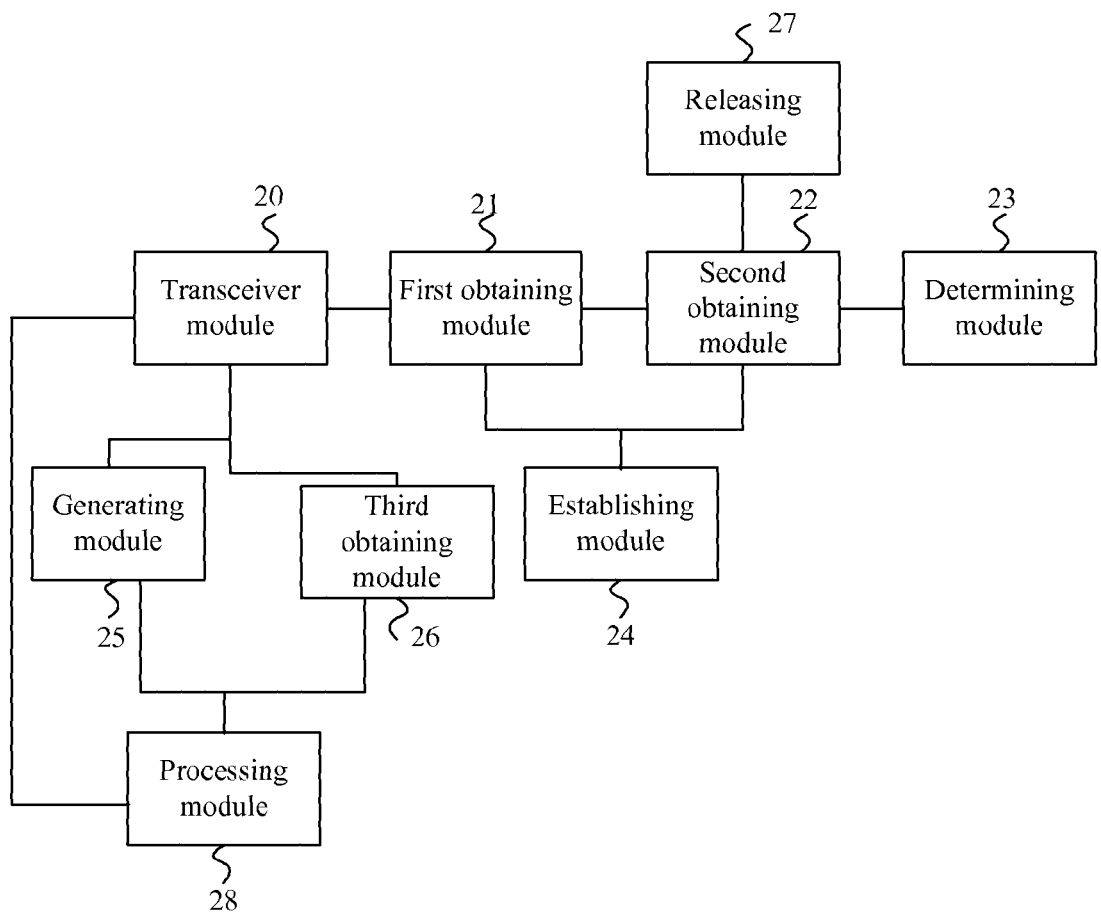
FIG. 13 is a schematic structural diagram of an RAN device according to yet another embodiment of the present invention.

FIG. 13 is a schematic structural diagram of an RAN device according to yet another embodiment of the present invention. As shown in FIG. 13, the RAN device of this embodiment is similar to the embodiment shown in the foregoing FIG. 12, and the difference lies in that the RAN device of this embodiment may further include an establishing module 24 on the basis of the embodiment shown in the foregoing FIG. 12. The establishing module 24 is configured to establish the correspondence between the identifier of the TCP data packet obtained by the first obtaining module 21 and the identifier of the at least one first data unit obtained by the second obtaining module 22. In this case, the first obtaining module and second obtaining module 22 are connected to the establishing module 24. The second obtaining module 22 is configured to obtain, according to the correspondence between the identifier of the TCP data packet and the identifier of the at least one first data unit which is established by the establishing module 24, the identifier of the at least one first data unit corresponding to the identifier of the TCP data packet which is obtained by the first obtaining module 21.

Optionally, the RAN device of this embodiment may further include a generating module 25, a third obtaining module 26, and a processing module 28.

The transceiver module 20 in this embodiment is further configured to receive a TCP data packet sent by a TCP transmit end in the network, where the TCP data packet carries an identifier of the TCP data packet. The generating module 25 is connected to the transceiver module 20 and the generating module 25 is configured to encapsulate the TCP data packet received by the transceiver module 20, with a radio link protocol, to generate at least one first data unit. The third obtaining module 26 is connected to the generating module 25 and the third obtaining module 26 is configured to identify each of the at least one first data unit generated by the generating module 25, and obtain the identifier of the at least one first data unit. The establishing module 24 is connected to the transceiver module 20 and third obtaining module 26 respectively and the establishing module 24 is configured to establish correspondence between the identifier of the TCP data packet received by the transceiver module 20 and the identifier of the at least one first data unit obtained after processing by the third obtaining module 26. The processing module 28 is configured to carry the identifier of the at least one first data unit in the at least one first data unit. The transceiver module 20 is further connected to the processing module 28 and the transceiver module 20 is configured to send the UE the at least one first data unit, which is obtained after processing by the processing module 28 and carries the identifier of the at least one data unit, that is, to send the UE at least one RLC protocol AMD PDU unit carrying the identifier of the at least one RLC protocol AMD PDU, for example, the corresponding identifier may be carried in each RLC protocol AMD PDU.

The transceiver module 20 in the RAN device of this embodiment is further configured to forward a received acknowledgement message indicating that the UE has successfully received the TCP data to the TCP transmit end.

The RAN device of this embodiment further includes a releasing module 27. The releasing module 27 is connected to the second obtaining module 22 and the releasing module 27 is configured to release the at least one first data unit corresponding to the identifier of the at least one first data unit obtained by the second obtaining module 22 in the buffer queue, so as to receive a new first data unit.

In the RAN device of this embodiment, message processing implemented by using the foregoing modules is the same as an implementation mechanism of a foregoing related method embodiment. For details, reference may be made to the record of the related method embodiment, and the message processing is not further described herein.

By using the foregoing modules in the RAN device of this embodiment, air interface bandwidth and frequency resources can be saved effectively and the TCP data packet transmission efficiency in the radio network is improved. Meanwhile, power consumption of the UE can be saved effectively, which prolongs the standby and working time of the UE.

Figure 14:
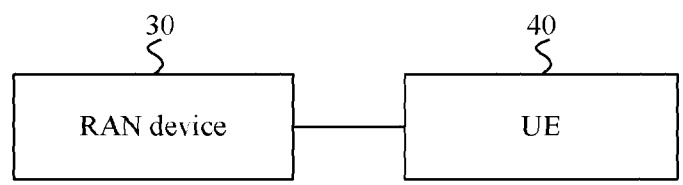
FIG. 14 is a schematic structural diagram of a network communications system according to an embodiment of the present invention.

FIG. 14 is a schematic structural diagram of a network communications system according to an embodiment of the present invention. As shown in FIG. 14, the network communications system of this embodiment includes an RAN device 30 and a UE 40.

The RAN device 30 in the network communications system of this embodiment is configured to: receive an RLC status report message sent by the UE 40; obtain, according to the RLC protocol status report message, identifiers of n first data units received by the UE 40, where the first data units are RLC protocol AMD PDUs; obtain, according to the identifiers of the n first data units and correspondence between an identifier of a sent TCP data packet and identifiers of m first data units, an identifier of a TCP data packet received by the UE 40; and determine, according to the identifier of the TCP data packet received by the UE, that the UE 40 has received the TCP data packet corresponding to the identifier of the TCP data packet. The n is a positive integer greater than or equal to 1; the m is also a positive integer greater than or equal to 1; and the identifiers of the m first data units include the identifiers of the n first data units.

The RAN device 30 in the network communications system of this embodiment may be the RAN device of the embodiment shown in the foregoing FIG. 10 or FIG. 11. The mechanism for implementing message processing by the network communications system of this embodiment is not further described herein. For details, reference may be made to record of a foregoing related method embodiment.

By using the foregoing RAN device in the network communications system of this embodiment, it is no longer necessary to receive a TCP data acknowledgement message, thereby saving air interface bandwidth and frequency resources effectively and improving the TCP data packet transmission efficiency. Correspondingly, the UE also no longer needs to send the TCP data acknowledgement message to the RAN device; on the basis of effectively saving air interface bandwidth and frequency resources, power consumption of the UE can be saved effectively, which prolongs the standby and working time of the UE.

Figure 15:
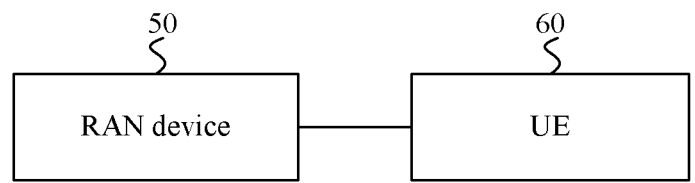
FIG. 15 is a schematic structural diagram of a network communications system according to another embodiment of the present invention.

FIG. 15 is a schematic structural diagram of a network communications system according to another embodiment of the present invention. As shown in FIG. 15, the network communications system of this embodiment includes an RAN device 50 and a UE 60.

The RAN device 50 in the network communications system of this embodiment is configured to: receive a TCP data acknowledgement message sent by the UE 60; obtain, according to the TCP data acknowledgement message, an identifier of a TCP data packet successfully received by the UE 60; obtain, according to correspondence between the identifier of the TCP data packet and an identifier of at least one first data unit, the identifier of the at least one first data unit corresponding to the identifier of the TCP data packet, where the first data unit is an RLC protocol AMD PDU; and determine that the UE has successfully received the at least one first data unit corresponding to the identifier of the at least one first data unit.

The RAN device 50 in the network communications system of this embodiment may be the RAN device of the embodiment shown in the foregoing FIG. 12 or FIG. 13. The mechanism for implementing message processing by the network communications system of this embodiment is not further described herein. For details, reference may be made to record of a foregoing related method embodiment.

By using the foregoing RAN device in the network communications system of this embodiment, it is no longer necessary to receive an RLC status report message sent by the UE, thereby saving air interface bandwidth and frequency resources effectively and improving the TCP data packet transmission efficiency. Correspondingly, the UE also no longer needs to send the RLC protocol status report message; on the basis of effectively saving air interface bandwidth and frequency resources, power consumption of the UE can be saved effectively, which prolongs the standby and working time of the UE.

The described apparatus embodiments are merely exemplary. The units described as separate parts may or may not be physically separate, and parts displayed as units may or may not be physical units, may be located in one position, or may be distributed on multiple network elements. A part or all of the modules may be selected according to actual needs to achieve the objectives of the solutions of the embodiments. A person of ordinary skill in the art will understand and implement the technical solutions without any creative effort.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments or make equivalent replacements to some technical features thereof, without departing from the spirit and scope of the technical solutions of the embodiments of the present invention.

What is claimed is:

1. A message processing method, comprising:
   receiving a radio link control protocol status report message sent by a user equipment;
   obtaining, according to the radio link control protocol status report message, identifiers of n first data unit(s) received by the user equipment, wherein the first data unit(s) is radio link control acknowledged mode data protocol data unit (RLC AMD PDU), and the n is a positive integer greater than or equal to 1;
   obtaining, according to the identifiers of the n first data unit(s) and correspondence between an identifier of a sent transmission control protocol data packet and identifiers of m first data unit(s), an identifier of a transmission data protocol data packet which has been received by the user equipment, wherein the m is a positive integer greater than or equal to 1, and the identifiers of the m first data unit(s) comprise the identifiers of the n first data unit(s); and
   determining, according to the identifier of the transmission data protocol data packet which has been received by the user equipment, that the user equipment has received the transmission data protocol data packet corresponding to the identifier of the transmission data protocol data packet.

2. The method according to claim 1, wherein the method further comprises:
   establishing the correspondence between the identifier of the sent transmission control protocol data packet and the identifiers of the m first data unit(s).

3. The method according to claim 2, wherein: before the establishing the correspondence between the identifier of the sent transmission control protocol data packet and the identifiers of the m first data unit(s), the method further comprises:
   receiving the sent transmission control protocol data packet from a transmission control protocol transmit end, wherein the sent transmission control protocol data packet carries the identifier of the sent transmission control protocol data packet;
   encapsulating the sent transmission control protocol data packet with a radio link control protocol to generate the m first data unit(s); and
   identifying each of the m first data unit(s) to obtain the identifiers of the m first data units;
   after the establishing the correspondence between the identifier of the sent transmission control protocol data packet and the identifiers of the m first data unit(s), the method further comprises:
   setting polling bit indication information in the m first data unit(s), and carrying the identifiers of the m first data unit(s) in the m first data unit(s); and
   sending the m first data unit(s) that carry the polling bit indication information and the identifiers of the m first data unit(s) to the user equipment.

4. The method according to claim 3, wherein before the encapsulating the sent transmission control protocol data packet with a radio link protocol, the method further comprises:
   verifying the sent transmission control protocol data packet to determine whether the sent transmission control protocol data packet is correct.

5. The method according to claim 1, wherein the method further comprises:
   sending an acknowledgment message of the transmission control protocol data packet to the transmission control protocol transmit end according to the identifier of the transmission data protocol data packet received by the user equipment.

6. The method according to claim 5, wherein the sending an acknowledgment message of the transmission control protocol data packet to the transmission control protocol transmit end according to the identifier of the transmission data protocol data packet received by the user equipment comprises:
   generating the acknowledgment message of the transmission control protocol data according to the identifier of the transmission data protocol data packet received by the user equipment, and setting a source IP address of the acknowledgment message of the transmission control protocol data packet to an IP address of the user equipment; and
   sending the acknowledgment message of the transmission control protocol data packet to the transmission control protocol transmit end.

7. A message processing method, comprising:
   receiving a transmission control protocol data acknowledgement message sent by a user equipment;

obtaining, according to the transmission control protocol data acknowledgement message, an identifier of a transmission control protocol data packet successfully received by the user equipment;

obtaining, according to correspondence between the identifier of the transmission control protocol data packet and an identifier of at least one first data unit, the identifier of the at least one first data unit corresponding to the identifier of the transmission control protocol data packet, wherein the first data unit is a radio link control protocol acknowledged mode data protocol data unit (RLC AMD PDU); and determining that the user equipment has successfully received the at least one first data unit corresponding to the identifier of the at least one first data unit.

8. The method according to claim 7, wherein the method further comprises:

establishing the correspondence between the identifier of the transmission control protocol data packet and the identifier of the at least one first data unit.

9. The method according to claim 8, wherein before the establishing the correspondence between the identifier of the transmission control protocol data packet and the identifier of the at least one first data unit, the method further comprises:

receiving the transmission control protocol data packet sent by a transmission control protocol transmit end, wherein the transmission control protocol data packet carries the identifier of the transmission control protocol data packet;

encapsulating the transmission control protocol data packet with a radio link protocol to generate the at least one first data unit; and identifying each of the at least one first data unit to obtain the identifier of the at least one first data unit;

after the establishing the correspondence between the identifier of the transmission control protocol data packet and the identifier of the at least one first data unit, the method further comprises:

carrying the identifier of the at least one first data unit in the at least one first data unit; and sending the at least one first data unit that carries the identifier of the at least one first data unit to the user equipment.

10. The method according to claim 7, wherein the method further comprises:

releasing the at least one first data unit corresponding to the identifier of the at least one first data unit in a buffer queue.

11. A radio access network device, comprising:
a transmitter, configured to receive a radio link control protocol status report message sent by a user equipment;
a processor configured to:
obtain, according to the radio link control protocol status report message received by the transmitter, identifiers of n first data unit(s) received by the user equipment, wherein the first data unit(s) is radio link control protocol acknowledged mode data protocol data unit (RLC AMD PDU), and the n is a positive integer greater than or equal to 1;
obtain, according to the identifiers of the n first data unit(s) obtained and correspondence between an identifier of a sent transmission control protocol data packet and identifiers of m first data unit(s), an identifier of a transmission data protocol data packet which has been received by the user equipment, wherein the m is a positive integer greater than or equal to 1, and the identifiers of the m first data unit(s) comprise the identifiers of the n first data unit(s); and
determine, according to the identifier of the transmission data protocol data packet received by the user equipment, that the user equipment has received the transmission data protocol data packet corresponding to the identifier of the transmission data protocol data packet which is obtained by the second obtaining module.

12. The device according to claim 11, wherein:
the processor is further configured to establish the correspondence between the identifier of the sent transmission control protocol data packet and the identifiers of the m first data unit(s).

13. The device according to claim 12, further comprises:
a receiver, configured to receive the sent transmission control protocol data packet from a transmission control protocol transmit end, wherein the sent transmission control protocol data packet carries the identifier of the sent transmission control protocol data packet;
the processor further configured to:
encapsulate the sent transmission control protocol data packet received by the transmitter, with a radio link protocol, to generate the m first data unit(s);
identify each of the m first data unit(s) generated to obtain the identifiers of the m first data unit(s);
set polling bit indication information in the m first data unit(s) generated, and carry, in the m first data unit(s), the identifiers of the m first data unit(s) obtained; and
send the m first data unit(s) carrying the polling bit indication information and the identifiers of the m first data unit(s) obtained, which are processed by the processor, to the user equipment.

14. The device according to claim 13, wherein:
the processor is further configured to verify the sent transmission control protocol data packet received by the transmitter to determine whether the sent transmission control protocol data packet is correct.

15. The device according to claim 13, wherein:
the processor is further configured to generate an acknowledgment message of the transmission control protocol data according to the identifier of the transmission data protocol data packet received by the user equipment;
the processor is further configured to set a source IP address of the acknowledgment message of the transmission control protocol data packet to an IP address of the user equipment; and
the transmitter is further configured to send the acknowledgment message of the transmission control protocol data packet generated by the processor to the transmission control protocol transmit end.

16. A radio access network device, comprising:
a transmitter, configured to receive a transmission control protocol data acknowledgement message sent by a user equipment;
a processor configured to:
obtain, according to the transmission control protocol data acknowledgement message received by the transmitter, an identifier of a transmission control protocol data packet successfully received by the user equipment;
obtain, according to correspondence between the identifier of the transmission control protocol data packet and an identifier of at least one first data unit, the identifier of the at least one first data unit corresponding to the identifier of the transmission control protocol data packet which is obtained, wherein the first data unit is a radio link control protocol acknowledged mode data protocol data unit; and determine that the user equipment has successfully received the at least one first data unit corresponding to the identifier of the at least one first data unit.

17. The device according to claim 16, wherein:

the processor is configured to establish the correspondence between the identifier of the transmission control protocol data packet obtained and the identifier of the at least one first data unit obtained.

18. The device according to claim 17, wherein:

the transmitter is further configured to receive the transmission control protocol data packet sent by a transmission control protocol transmit end, wherein the transmission control protocol data packet carries the identifier of the transmission control protocol data packet;

the processor is further configured to encapsulate the transmission control protocol data packet received by the transmitter, with a radio link protocol, to generate the at least one first data unit;

the processor is further configured to identify each of the at least one first data unit generated by the generating module to obtain the identifier of the at least one first data unit;

the processor is further configured to carry, in the at least one first data unit generated, the identifier of the at least one first data unit obtained; and the transmitter is further configured to send the at least one first data unit, which is obtained after processing and carries the identifier of the at least one first data unit, to the user equipment.

19. The device according to claim 16, wherein:

the processor is further configured to release the at least one first data unit corresponding to the identifier of the at least one first data unit which is obtained, in a buffer queue.

\* \* \* \* \*